(12) United States Patent
Jeon et al.

(10) Patent No.: US 10,567,066 B2
(45) Date of Patent: Feb. 18, 2020

(54) APPARATUS AND METHOD FOR PERFORMING PRECODING IN WIRELESS COMMUNICATION SYSTEM USING MASSIVE ANTENNA

(71) Applicant: Samsung Electronics Co., Ltd., Suwon-si, Gyeonggi-do (KR)

(72) Inventors: Young-Hyun Jeon, Seoul (KR); Seungjoo Maeng, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/343,279

(22) PCT Filed: Oct. 18, 2017

(86) PCT No.: PCT/KR2017/011493
§ 371 (c)(1),
(2) Date: Apr. 18, 2019

(87) PCT Pub. No.: WO2018/074828
PCT Pub. Date: Apr. 26, 2018

(65) Prior Publication Data
US 2019/0260459 A1    Aug. 22, 2019

(30) Foreign Application Priority Data

Oct. 18, 2016  (KR) .......................... 10-2016-0135353

(51) Int. Cl.
*H04B 7/08*  (2006.01)
*H04B 17/336*  (2015.01)
(Continued)

(52) U.S. Cl.
CPC ............. *H04B 7/0857* (2013.01); *H04B 7/04* (2013.01); *H04B 7/0408* (2013.01);
(Continued)

(58) Field of Classification Search
CPC ...... H04B 7/04; H04B 7/0404; H04B 7/0408; H04B 7/0413; H04B 7/0417;
(Continued)

(56) References Cited

U.S. PATENT DOCUMENTS

2013/0078991 A1    3/2013  Nam
2013/0272263 A1*  10/2013  Pi .......................... H04W 72/042
                                                                    370/330
(Continued)

FOREIGN PATENT DOCUMENTS

KR    10-2013-0097117 A    9/2013
KR    10-2015-0083377 A    7/2015

OTHER PUBLICATIONS

Nokia, Alcatel-Lucent Shanghai Bell; 3GPP TSG-RAN WG1#85; Hybrid CSI Measurement and Reporting Schemes; Discussion and Decision; R1-164339; May 27, 2016; Nanjing, China.
(Continued)

*Primary Examiner* — Young S Tse
(74) *Attorney, Agent, or Firm* — Jefferson IP Law, LLP

(57) ABSTRACT

The disclosure is related to a pre-5th-Generation (5G) or 5G communication system to be provided for supporting higher data rates Beyond 4th-Generation (4G) communication system such as Long Term Evolution (LTE). The disclosure is related to a precoding/beamforming using a massive antenna. A method for operating a base station in a wireless communication system includes transmitting vertical reference signals and horizontal reference signals that are generated based on an interference relation between terminals, receiving long-term channel information determined by using the vertical reference signals and the horizontal reference signals, transmitting group-specific reference signals beamformed by a first beamformer generated based on the long-term channel information, receiving short-term channel information determined by using the group-specific
(Continued)

reference signals, and transmitting a data signal beamformed by a second beamformer generated based on the short-term channel information.

20 Claims, 16 Drawing Sheets

(51) Int. Cl.
  *H04B 7/0456* (2017.01)
  *H04B 7/06* (2006.01)
  *H04B 7/04* (2017.01)
  *H04B 7/0408* (2017.01)
  *H04B 7/0491* (2017.01)

(52) U.S. Cl.
  CPC ......... *H04B 7/0456* (2013.01); *H04B 7/0473* (2013.01); *H04B 7/0491* (2013.01); *H04B 7/06* (2013.01); *H04B 7/0617* (2013.01); *H04B 7/0619* (2013.01); *H04B 7/08* (2013.01); *H04B 7/088* (2013.01); *H04B 17/336* (2015.01)

(58) Field of Classification Search
  CPC .. H04B 7/0452; H04B 7/0456; H04B 7/0473; H04B 7/0491; H04B 7/06; H04B 7/0617; H04B 7/0619; H04B 7/0626; H04B 7/08; H04B 7/088; H04B 7/0882; H04B 7/26; H04B 7/2606; H04B 7/2618; H04B 7/2628; H04B 17/336
  USPC ........ 375/260, 262, 265, 267; 370/208, 210, 370/335, 342
  See application file for complete search history.

(56) References Cited

U.S. PATENT DOCUMENTS

| | | | |
|---|---|---|---|
| 2013/0287064 A1* | 10/2013 | Seo | H04J 13/18 375/144 |
| 2013/0329664 A1* | 12/2013 | Kim | H04W 24/10 370/329 |
| 2014/0079149 A1* | 3/2014 | Lee | H04B 7/0417 375/267 |
| 2014/0098689 A1* | 4/2014 | Lee | H04B 7/0469 370/252 |
| 2015/0016379 A1 | 1/2015 | Nam et al. | |
| 2015/0358982 A1 | 12/2015 | Jeon et al. | |
| 2015/0372727 A1 | 12/2015 | Ribeiro et al. | |
| 2016/0277082 A1 | 9/2016 | Janse Van Rensburg et al. | |
| 2016/0308647 A1* | 10/2016 | Kwak | H04B 7/0486 |
| 2018/0084502 A1* | 3/2018 | Choi | H04B 7/04 |
| 2018/0248606 A1* | 8/2018 | Choi | H04B 7/0478 |

OTHER PUBLICATIONS

Samsung; 3GPP TSG RAN WG1 #86-bis; Discussions on CSI-RS design for NR MIMO; Discussion and Decision; R1-1609098; Oct. 14, 2016; Lisbon, Portugal.

Intel Corporation; 3GPP TSG RAN WG1 Meeting #86-bis; Discussion on CSI-RS design for NR; Discussion; R1-1609528; Oct. 14, 2016; Lisbon, Portugal.

Nokia, Alcatel-Lucent Shanghai Bell; 3GPP TSG-RAN WG1 #86-Bis; High-level principles for beam coordination and link adaptation in NR; Discussion and Decision; R1-1610254; Oct. 14, 2016; Lisbon, Portugal.

Ansuman et al.; Joint Spatial Division and Multiplexing—The Large-Scale Array Regime; IEEE Transactions on Information Theory, vol. 59, No. 10; Oct. 2013.

* cited by examiner

APPARATUS AND METHOD FOR PERFORMING PRECODING IN WIRELESS COMMUNICATION SYSTEM USING MASSIVE ANTENNA

TECHNICAL FIELD

The disclosure relates generally to a wireless communication system and, more particularly, to a device and a method for performing precoding in a wireless communication system using a massive antenna.

BACKGROUND ART

To meet the demand for wireless data traffic having increased since deployment of 4th generation (4G) communication systems, efforts have been made to develop an improved 5th generation (5G) or pre-5G communication system. Therefore, the 5G or pre-5G communication system is also called a 'Beyond 4G Network' or a 'Post Long Term Evolution (LTE) System'.

The 5G communication system is considered to be implemented in higher frequency (mmWave) bands, e.g., 28 GHz or 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid frequency shift keying (FSK) and quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

In a multi-user massive MIMO system serving a plurality of users at the same time, accurate channel state information at a transmitter (CSIT) needs to be obtained in order to secure spectral efficiency in massive MIMO. To this end, however, radio resources are required for a large number of reference signals and a large quantity of channel state information feedback (e.g., a precoding matrix indicator (PMI), a rank indicator (RI), and channel quality information (CQI)). Further, as the number of users capable of being simultaneously served with a massive transmission antenna is significantly increasing, there is a practical problem of remarkably increased complexity in precoding calculation compared to the prior art. Therefore, it is required to design a beamformer for effectively controlling interference and for reinforcing transmission power. Further, a beamformer for a multi-cell massive MIMO system is effective in interference control when jointly designed in association with cooperative communication and coordinated multi-points (CoMP), and thus a joint design in association with cooperative communication/CoMP is required for a beamformer.

DISCLOSURE OF INVENTION

Technical Problem

The disclosure provides apparatus and methods for effectively performing beamforming using a massive antenna in a wireless communication system.

Also, the disclosure provides apparatus and methods for performing two-stage beamforming using a massive antenna in a wireless communication system.

Further, the disclosure provides apparatus and methods for performing two-stage beamforming in multi-cell cooperative communication in a wireless communication system.

In addition, the disclosure provides apparatus and methods for supporting two-stage beamforming for frequency division duplex (FDD)-based full-dimensional (FD)-multiple-input multiple-output (MIMO) in a multi-cell environment in a wireless communication system.

Furthermore, the disclosure provides apparatus and methods for performing user grouping suitable for cooperative communication and inter-group interference control in a wireless communication system.

Solution to Problem

According to various embodiments of the disclosure, a method for operating a base station in a wireless communication system includes transmitting vertical reference signals and horizontal reference signals that are generated based on an interference relationship between terminals, receiving long-term channel information determined by using the vertical reference signals and the horizontal reference signals, transmitting reference signals beamformed by a first beamformer generated based on the long-term channel information, receiving short-term channel information determined by using the beamformed reference signals, and transmitting a data signal beamformed by a second beamformer generated based on the short-term channel information.

According to various embodiments of the disclosure, a method for operating a terminal in a wireless communication system includes receiving, from a base station, vertical reference signals and horizontal reference signals that are generated based on an interference relationship between terminals, transmitting long-term channel information determined by using the vertical reference signals and the horizontal reference signals, receiving reference signals beamformed by a first beamformer generated based on the long-term channel information, transmitting short-term channel information determined by using the beamformed reference signals, and receiving a data signal beamformed by a second beamformer generated based on the short-term channel information.

According to various embodiments of the disclosure, a base station in a wireless communication system includes a wireless communication unit to transmit a signal and a controller to control the wireless communication unit, wherein the controller performs control to transmit vertical reference signals and horizontal reference signals that are generated based on an interference relationship between terminals, receive long-term channel information determined by using the vertical reference signals and the horizontal reference signals, transmit reference signals beamformed by a first beamformer generated based on the long-term channel information, receive short-term channel information determined by using the beamformed reference signals, and transmit a data signal beamformed by a second beamformer generated based on the short-term channel information.

According to various embodiments of the disclosure, a terminal in a wireless communication system includes: a wireless communication unit to transmit a signal; and a controller to control the wireless communication unit, wherein the at least one processor is configured to control to receive, from a base station, vertical reference signals and horizontal reference signals that are generated based on an interference relationship between terminals, transmit long-term channel information determined by using the vertical reference signals and the horizontal reference signals, receive reference signals beamformed by a first beamformer generated based on the long-term channel information, transmit short-term channel information determined by using the beamformed reference signals, and receive a data signal beamformed by a second beamformer generated based on the short-term channel information.

Advantageous Effects of Invention

Apparatus and methods according to various embodiments of the disclosure stably provide downlink long-term channel information in a reliable form so that two-stage beamforming can be implemented in a multi cell environment in a frequency division duplex (FDD)-based full-dimensional (FD)-multiple-input multiple-output (MIMO) system. Further, according to various embodiments, in user grouping suitable for cooperative communication and inter-group interference control, pre-beamforming is extended up to coordinated beamforming and joint processing, thereby improving frequency efficiency.

Effects which can be acquired by the disclosure are not limited to the above described effects, and other effects that have not been mentioned may be clearly understood by those skilled in the art from the following description.

BEST MODE FOR CARRYING OUT THE INVENTION

Figure 1:
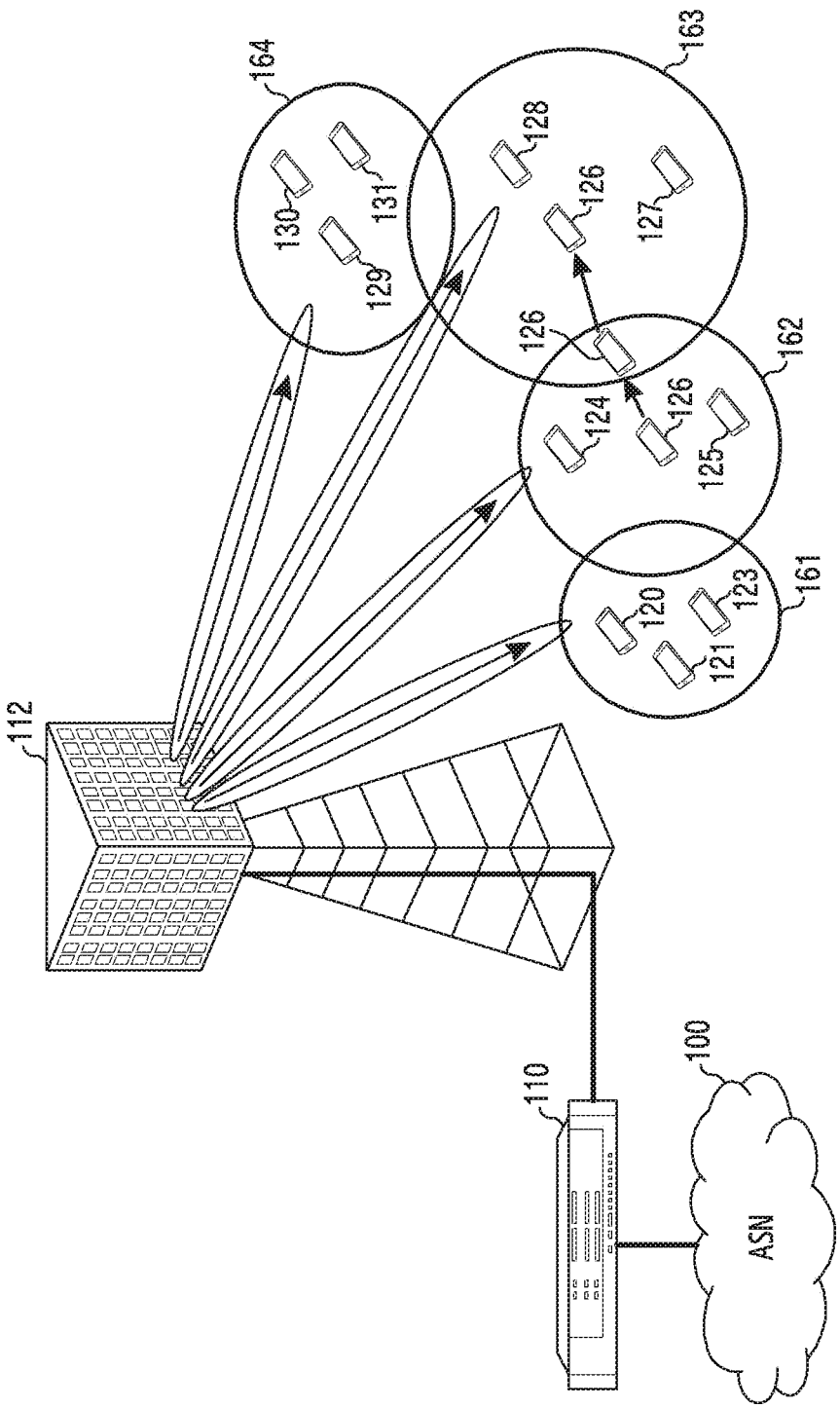
FIG. 1 illustrates a wireless communication system according to various embodiments of the disclosure.

The terms used in the disclosure are only used to describe specific embodiments, and are not intended to limit the disclosure. A singular expression may include a plural expression unless they are definitely different in a context. Unless defined otherwise, all terms used herein, including technical and scientific terms, have the same meaning as those commonly understood by a person skilled in the art to which the disclosure pertains. Such terms as those defined in a generally used dictionary may be interpreted to have the meanings equal to the contextual meanings in the relevant field of art, and are not to be interpreted to have ideal or excessively formal meanings unless clearly defined in the disclosure. In some cases, even the term defined in the disclosure should not be interpreted to exclude embodiments of the disclosure.

Hereinafter, various embodiments of the disclosure will be described based on an approach of hardware. However, various embodiments of the disclosure include a technology that uses both hardware and software and thus, the various embodiments of the disclosure may not exclude the perspective of software.

The disclosure relates to apparatus and methods for performing precoding in a wireless communication system. Specifically, the disclosure relates to a massive multiple-input multiple-output (massive MIMO) system as a technology for improving frequency efficiency in a wireless communication system using a massive antenna.

As used herein, a term referring to a signal processor (e.g., a precoder), a term referring to control information (e.g., feedback information or a codebook index), a term referring to a channel, terms referring to network entities, terms referring to messages, a term referring to a component of a device, and the like are used for convenience of explanation. Therefore, the disclosure is not limited by the following terms, and other terms having equivalent technical meanings may be used.

For example, as used below, the term "precoder" refers to a vector or a matrix for processing signals, and may be replaced with "precoding matrix", "beamformer", or "beamforming matrix". Further, if necessary, the term "precoder" refers to a processor, a module, or a functional block that processes a signal using a vector or a matrix, and may be replaced with "beamforming unit/module", "precoding unit/module", or the like.

Further, although the disclosure illustrates various embodiments using terms used in some communication standards (e.g., long-term evolution (LTE) and LTE-advanced (LTE-A) systems), these standards are provided merely for convenience of description. Various embodiments of the disclosure may be easily modified and applied to other communication systems.

In general, massive antenna systems are under discussion mostly with respect to a time division duplex (TDD) mode, because a frequency division duplex (FDD) mode requires radio resources for an impractically large number of reference signals (RSs, e.g., a common RS (CRS) and a channel state information (CSI)-RS in LTE) and channel state information feedback (a precoding matrix indicator (PMI), a rank indicator (RI), and channel quality information (CQI)) so that a transmitter obtains channel state information. That is, in an FDD system, the size of full CSI-based channel pilot/training and channel feedback for massive transmission antennas is very large in terms of massive MIMO implementation. Therefore, it has been considered impossible to obtain channel state information at a transmitter (CSIT), and to obtain a spatial multiplexing gain using a multiple user (MU)-MIMO scheme.

Accordingly, the disclosure describes channel estimation, feedback, and precoding techniques that can be applied and implemented in the FDD mode. That is, various embodiments relate to a MIMO communication method in a massive antenna system, and more particularly to a massive MIMO communication technology in which two-stage beamforming is performed using a low-rank dimensionality reduction property of a channel in a correlated channel environment of a massive MIMO antenna system, whereby uplink/downlink frequency efficiency is improved while requiring a smaller amount of channel state information feedback.

FIG. 1 illustrates a wireless communication system according to various embodiments of the disclosure. FIG. 1 illustrates a base station 110 and terminals 120 to 131 as some nodes using a wireless channel in the wireless communication. Although FIG. 1 shows only one base station, another base station equivalent or similar to the base station 110 may be further included.

An access service network (ASN) 100 is a piece of infrastructure that provides radio access for the terminals 120 to 131. The ASN 100 may include a plurality of entities. For example, the ASN 100 may include a gateway, a mobility management entity (MME), or the like.

The base station 110 is a piece of network infrastructure that controls the use of radio resources and radio access of the terminals 120 to 131. The base station 110 has coverage defined as a certain geographic area based on the distance over which the base station 110 can transmit a signal. The base station 110 may be referred to as an access point (AP), an eNodeB (eNB), a 5th-generation (5G) node, a wireless point, or a transmission/reception point (TRP) in addition to a base station. The base station 110 transmits and receives radio signals through at least one antenna array 112. The at least one antenna array 112 may be a massive antenna or a large-scale antenna. The base station 110 and the at least one antenna array 112 may be installed to be geographically adjacent to each other or to be distant from each other.

Each of the terminals 120 to 131 is a device used by a user, and communicates with the base station 110 through a wireless channel. In some cases, at least one of the terminals 120 to 131 may be operated without a user's involvement. That is, at least one of the terminals 120 to 131 may be a device performing machine-type communication (MTC), and may not be carried by a user. The terminals 120 to 131 may be classified into a plurality of groups 161 to 164. The plurality of groups 161 to 164 is targets of pre-beamforming, to be described below, and post-beamforming is performed in each group. Each of the terminals 120 to 131 may be referred to as user equipment (UE), a mobile station, a subscriber station, a remote terminal, a wireless terminal, or a user device in addition to a terminal.

The base station 110 and the terminals 120 to 131 may transmit and receive radio signals in a millimeter wave (mmWave) band (e.g., 28 GHz, 30 GHz, 38 GHz, or 60 GHz). Here, in order to improve channel gain, the base station 110 and the terminals 120 to 131 may perform beamforming Here, beamforming may include transmission beamforming and reception beamforming That is, the base station 110 and the terminals 120 to 131 may assign directivity to a transmission signal or a reception signal.

Figure 2:
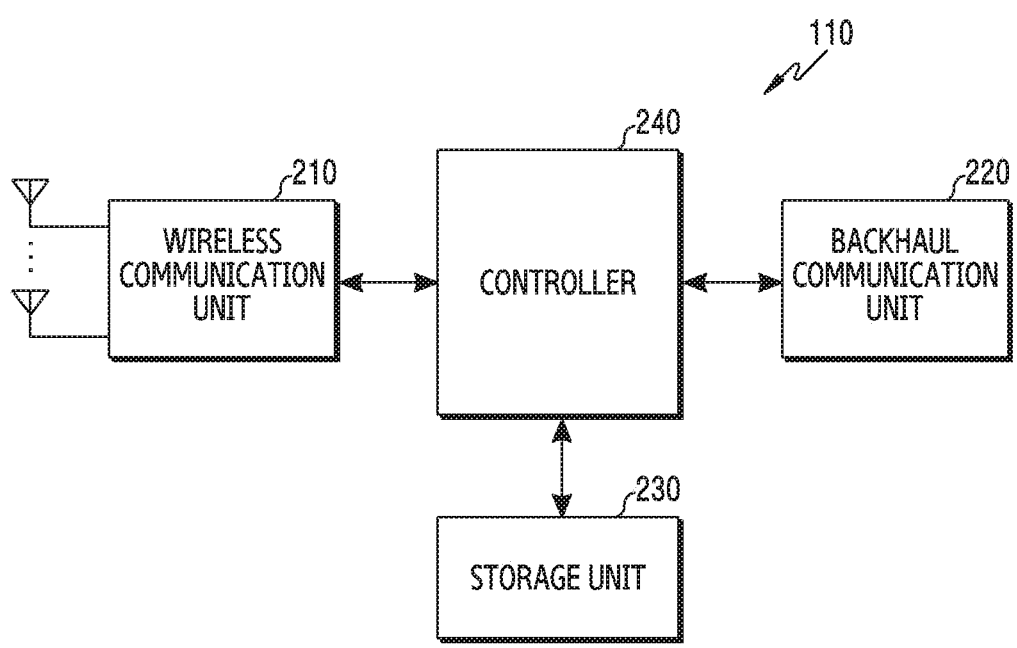
FIG. 2 illustrates the configuration of a base station in a wireless communication system according to various embodiments of the disclosure.

FIG. 2 illustrates the configuration of a base station in a wireless communication system according to various embodiments of the disclosure. The terms " . . . unit," " . . . or/er," and the like used herein indicate a unit for processing at least one function or operation, which may be implemented by hardware, software, or a combination thereof.

Referring to FIG. 2, the base station 110 includes a wireless communication unit 210, a backhaul communication unit 220, a storage unit 230, and a controller 240.

The wireless communication unit 210 performs functions for transmitting or receiving a signal through a wireless channel. For example, the wireless communication unit 210 performs a function of conversion between a baseband signal and a bit stream according to the physical layer specification of a system. For example, in data transmission, the wireless communication unit 210 encodes and modulates a transmitted bit stream to generate complex symbols. Further, in data reception, the wireless communication unit 210 demodulates and decodes a baseband signal to reconstruct a received bit stream. The wireless communication unit 210 upconverts a baseband signal into a Radio-Frequency (RF)-band signal, and may transmit the RF-band signal through an antenna. The wireless communication unit 210 downconverts an RF-band signal, received through the antenna, into a baseband signal.

To this end, the wireless communication unit 210 may include a transmission filter, a reception filter, an amplifier, a mixer, an oscillator, a digital-to-analog converter (DAC), an analog-to-digital converter (ADC), or the like. Further, the wireless communication unit 210 may include a plurality of transmission/reception paths. In addition, the wireless communication unit 210 may include at least one antenna array including a plurality of antenna elements. From the aspect of hardware, the wireless communication unit 210 may include a digital unit and an analog unit, and the analog unit may include a plurality of sub-units according to operating power, operating frequency, or the like.

As described above, the wireless communication unit 210 transmits and receives a signal. Accordingly, the wireless communication unit 210 may be referred to as a transmitter, a receiver, or a transceiver. In the following description, transmission and reception performed through a wireless channel are construed as including processing performed as above by the wireless communication unit 210.

The backhaul communication unit 220 provides an interface for performing communication with other nodes in a network. That is, the backhaul communication unit 220 converts a bit stream, which is transmitted from the base station 110 to another node, for example, another access node, another base station, a higher node, a core network, or the like, into a physical signal, and converts a physical signal, which is received from another node, into a bit stream.

The storage unit 230 stores data, such as a default program, an application, and setting information, for the operation of the base station 110. The storage unit 230 may be configured as volatile memory, nonvolatile memory, or a combination of volatile memory and nonvolatile memory. The storage unit 230 provides the stored data in response to a request from the controller 240.

The controller 240 controls the overall operation of the base station. For example, the controller 240 transmits and receives a signal through the wireless communication unit 210 or the backhaul communication unit 220. Further, the controller 240 records and reads data in the storage unit 230. To this end, the controller 240 may include at least one processor. According to various embodiments, the controller 240 performs precoding using feedback information received from a terminal 120. For example, the controller 240 may control the base station 110 to perform operations according to various embodiments to be described.

Figure 3:
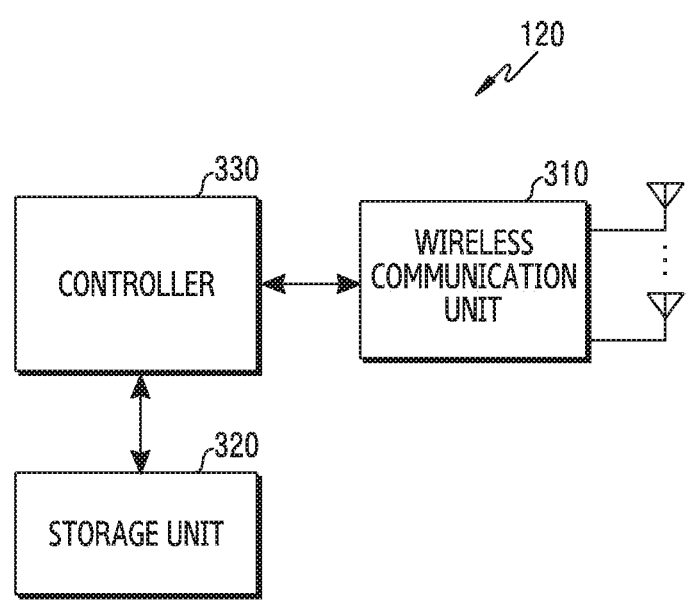
FIG. 3 illustrates the configuration of a terminal in a wireless communication system according to various embodiments of the disclosure.

FIG. 3 illustrates the configuration of a terminal in a wireless communication system according to various embodiments of the disclosure. The terms " . . . unit," " . . . or/er," and the like used herein indicate a unit for processing at least one function or operation, which may be implemented by hardware, software, or a combination thereof.

Referring to FIG. 3, the terminal 120 includes a wireless communication unit 310, a storage unit 320, and a controller 330.

The wireless communication unit 310 performs functions for transmitting or receiving a signal through a wireless channel. For example, the wireless communication unit 310 performs a function of converting between a baseband signal and a bit stream according to the physical layer specification of a system. For example, in data transmission, the wireless communication unit 310 encodes and modulates a transmitted bit stream to generate complex symbols. Further, in data reception, the wireless communication unit 310 demodulates and decodes a baseband signal to reconstruct a received bit stream. The wireless communication unit 310 upconverts a baseband signal into an RF-band signal and may transmit the RF-band signal through an antenna. The wireless communication unit 310 downconverts an RF-band signal, received through the antenna, into a baseband signal. For example, the communication unit 310 may include a transmission filter, a reception filter, an amplifier, a mixer, an oscillator, a DAC, an ADC, or the like.

Further, the wireless communication unit 310 may include a plurality of transmission/reception paths. In addition, the wireless communication unit 310 may include at least one antenna array including a plurality of antenna elements. From the aspect of hardware, the wireless communication unit 310 may include a digital circuit and an analog circuit (e.g., a radio frequency integrated circuit (RFIC)). Here, the digital circuit and the analog circuit may be configured as a single package. Further, the wireless communication unit 310 may include a plurality of RF chains. The wireless communication unit 310 may perform beamforming.

As described above, the wireless communication unit 310 transmits and receives a signal. Accordingly, the wireless communication unit 310 may be referred to as a transmitter, a receiver, or a transceiver. In the following description, transmission and reception performed through a wireless channel are to be understood as including processing performed as described above by the wireless communication unit 310.

The storage unit 320 stores data, such as a default program, an application, and setting information, for the operation of the terminal 120. The storage unit 320 may be configured as volatile memory, nonvolatile memory, or a combination of volatile memory and nonvolatile memory. The storage unit 320 provides the stored data in response to a request from the controller 330.

The controller 330 controls the overall operation of the terminal 120. For example, the controller 330 transmits and receives a signal through the communication unit 310. Further, the controller 330 records and reads data in the storage unit 320. To this end, the controller 330 may include at least one processor or microprocessor, or may be configured as a part of a processor. A part of the communication unit 310 and the controller 330 may be referred to as a communication processor (CP). Particularly, according to various embodiments, the controller 330 controls the terminal to perform measurement and reporting for precoding of a base station. For example, the controller 330 may control the terminal to perform operations according to various embodiments to be described.

Figure 4A:
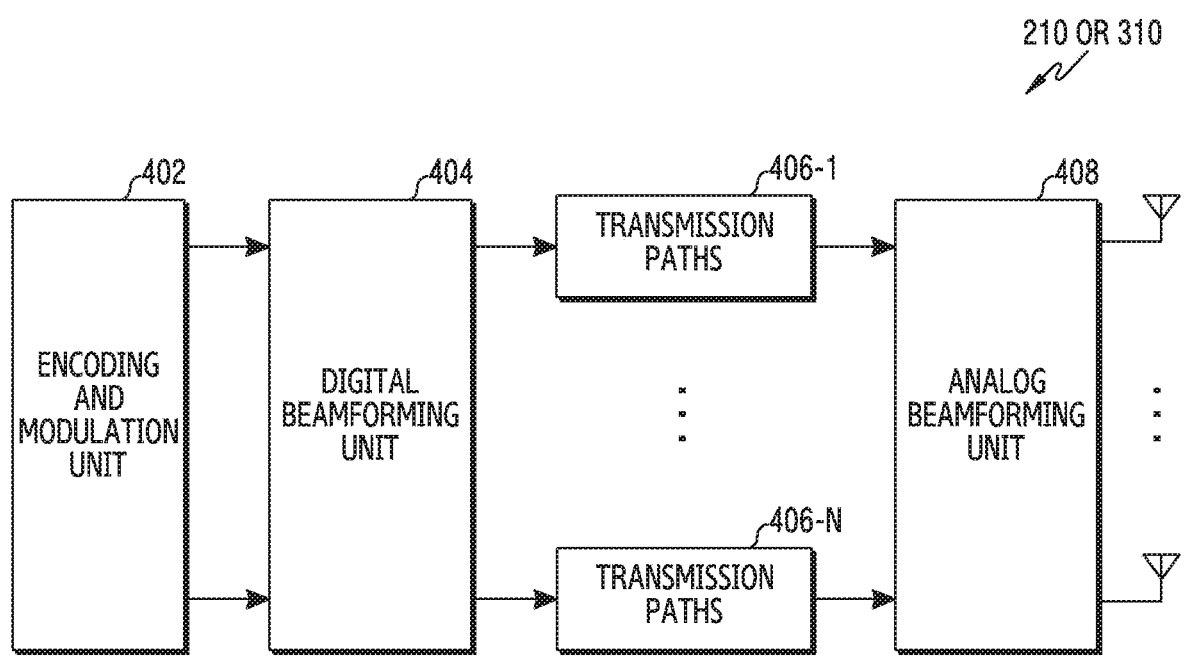
FIGS. 4A, 4B, and 4C illustrate the configuration of a communication unit in a wireless communication system according to various embodiments of the disclosure.
Figure 4B:
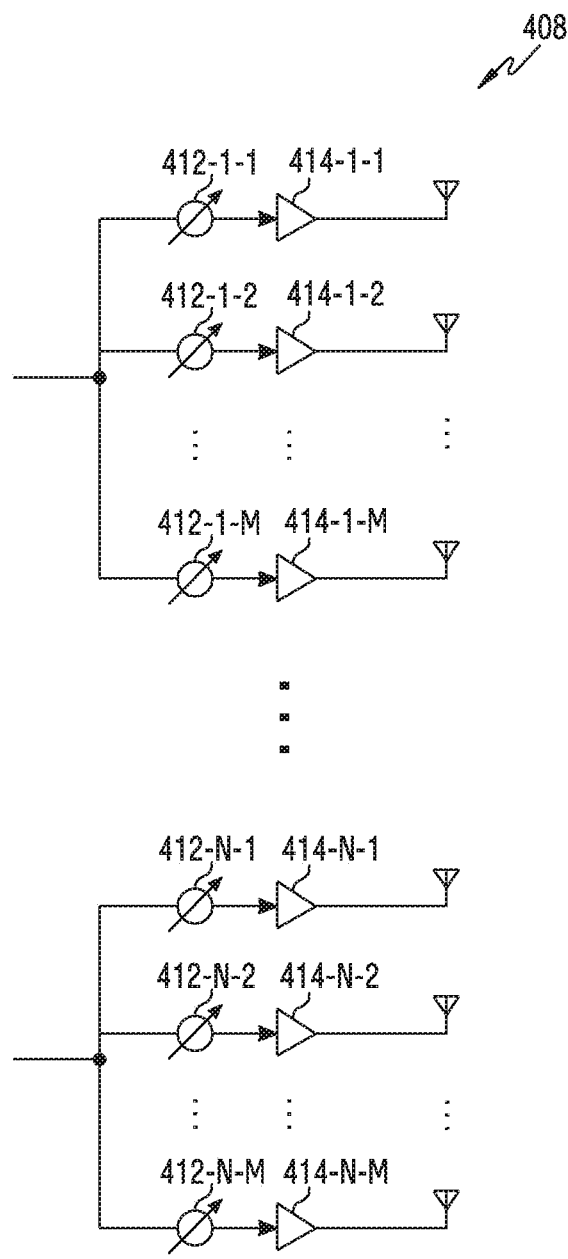
Figure 4C:
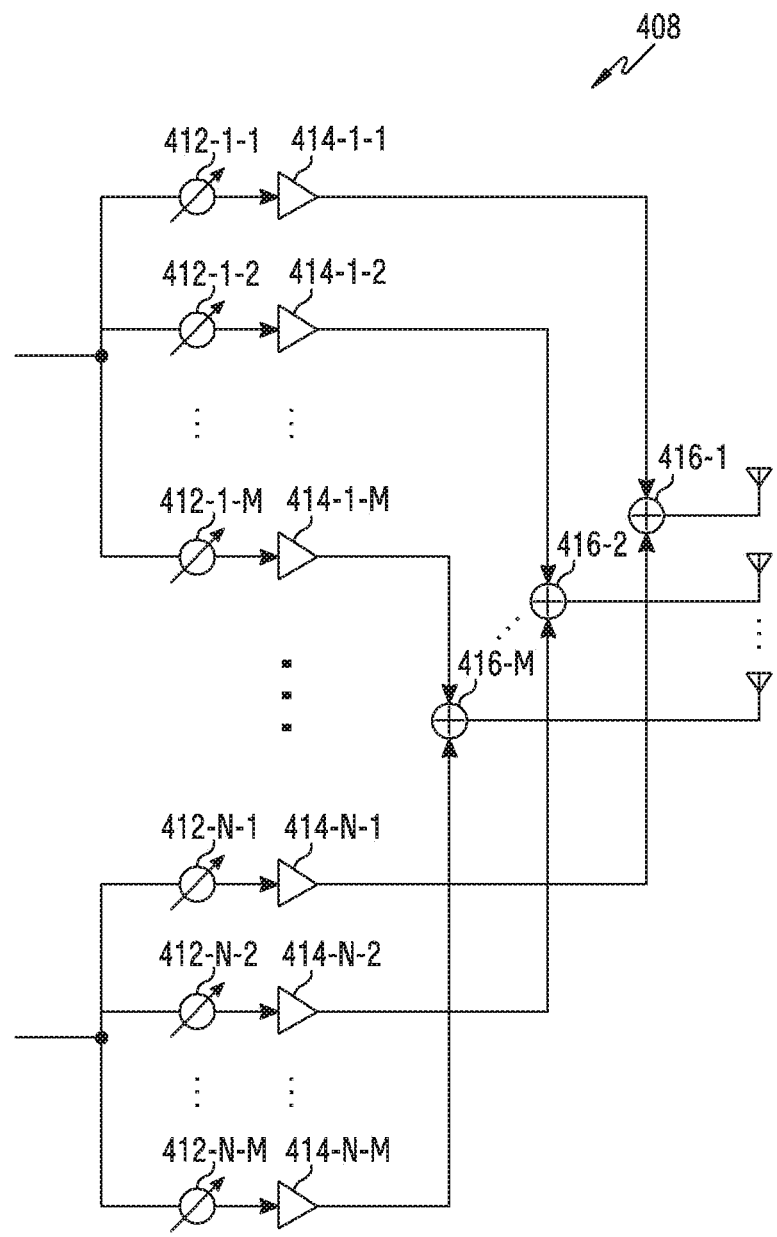

FIGS. 4A, 4B, and 4C illustrate the configuration of a communication unit in a wireless communication system according to various embodiments of the disclosure. FIGS. 4A, 4B, and 4C illustrate examples of the detailed configuration of the wireless communication unit 210 in FIG. 2 or the wireless communication unit 310 in FIG. 3. Specifically, FIGS. 4A to 4C illustrate components for performing beamforming as part of the wireless communication unit 210 in FIG. 2 or the wireless communication unit 310 in FIG. 3.

Referring to FIG. 4A, the wireless communication unit 210 or 310 includes an encoding and modulation unit 402, a digital beamforming unit 404, a plurality of transmission paths 406-1 to 406-N, and an analog beamforming unit 408.

The encoding and modulation unit 402 performs channel encoding. For channel encoding, at least one of low-density parity-check (LDPC) code, convolutional code, and polar code may be used. The encoding and modulation unit 402 generates modulation symbols by performing constellation mapping.

The digital beamforming unit 404 performs beamforming on a digital signal (e.g., the modulation symbols). To this end, the digital beamforming unit 404 multiplies the modulation symbols by beamforming weights. Here, the beamforming weights are used to change the size and phase of a signal, and may be referred to as a precoding matrix, a precoder, or the like. The digital beamforming unit 404 outputs the digital-beamformed modulation symbols to the plurality of transmission paths 406-1 to 406-N. Here, according to a multiple-input multiple-output (MIMO) transmission scheme, the modulation symbols may be multiplexed, or the same modulation symbols may be provided to the plurality of transmission paths 406-1 to 406-N.

The plurality of transmission paths 406-1 to 406-N converts the digital-beamformed digital signals into analog signals. To this end, each of the plurality of transmission paths 406-1 to 406-N may include an inverse fast fourier transform (IFFT) operation unit, a cyclic prefix (CP) inserter, a DAC, and an upconverter. The CP inserter is for an orthogonal frequency-division multiplexing (OFDM) scheme, and may be excluded when another physical layer scheme (e.g., filter bank multi-carrier (FBMC)) is applied. That is, the plurality of transmission paths 406-1 to 406-N provides independent signal processing processes for a plurality of streams generated through digital beamforming.

However, some components of the plurality of transmission paths 406-1 to 406-N may be used in common depending on the implementation scheme.

The analog beamforming unit 408 performs beamforming on the analog signals. To this end, the digital beamforming unit 404 multiplies the analog signals by beamforming weights. Here, the beamforming weights are used to change the size and phase of a signal. Specifically, depending on the plurality of transmission paths 406-1 to 406-N and the antennas, the analog beamforming unit 408 may be configured as shown in FIG. 4B or FIG. 4C depending on the connection structure between the plurality of transmission paths 406-1 to 406-N and antennas.

Referring to FIG. 4B, signals input to the analog beamforming unit 408 are transmitted through antennas via phase/size conversion and amplification. Here, the signals transmitted through respective paths are transmitted through different antenna sets, that is, different antenna arrays. Referring to processing of a signal input through a first path, the signal is converted by phase/size converters 412-1-1 to 412-1-M into signal sequences having different phases/sizes or the same phase/size, which are amplified by amplifiers 414-1-1 to 414-1-M and then transmitted through the antennas.

Referring to FIG. 4C, signals input to the analog beamforming unit 408 are transmitted through antennas via phase/size conversion and amplification. Here, the signals of respective paths are transmitted through the same antenna set, that is, the same antenna array. Referring to processing of a signal input through a first path, the signal is converted by phase/size converters 412-1-1 to 412-1-M into signal sequences having different phases/sizes or the same phase/size, which are amplified by amplifiers 414-1-1 to 414-1-M. Then, the amplified signals are added by adders 416-1-1 to 416-1-M on the basis of an antenna element so as to be transmitted through one antenna array, and are then transmitted through the antennas.

FIG. 4B shows an example in which an independent antenna array is used for each transmission path, while FIG. 4C shows an example in which the transmission paths share a single antenna array. However, according to another embodiment, some transmission paths may use independent antenna arrays, and the remaining transmission paths may share a single antenna array. Further, according to still another embodiment, a structure that can adaptively change according to the situation may be used by applying a switchable structure between transmission paths and antenna arrays.

Various beamforming/precoding operations to be described below may be performed according to the structures described with reference to FIG. 4A, FIG. 4B, and FIG. 4C. Here, not only all of the components illustrated in FIG. 4A, FIG. 4B, and FIG. 4C but also only some of the components may be used for the beamforming/precoding operations. That is, according to various embodiments, the beamforming/precoding operations to be described below may be performed as digital beamforming/precoding or analog beamforming/precoding.

The disclosure relates to a general cellular wireless mobile communication system, and more particularly to a method and a device for transmitting and receiving channel state information in which a terminal measures a wireless channel state and notifies a base station of a measurement result in a wireless mobile communication system employing a multiple-access scheme using multiple carriers, such as orthogonal frequency division multiple access (OFDMA).

Specifically, various embodiments provide a multi-user MIMO and coordinated scheduling (CS)/coordinated beamforming (CB) technology that enables large-scale spatial multiplexing by a base station effectively transmitting independent vertical/horizontal channel state information reference signals (CSI-RSs) and effectively obtaining downlink channel information of a multi-cell environment when CS/CB is applied in consideration of interference control and cooperative communication in a two-dimensional array planar antenna based full-dimensional (FD) MIMO downlink system that operates in a FDD mode.

More specifically, an embodiment relates to a massive MIMO communication method that requires less channel state information feedback and maximizes frequency efficiency in a multi-cell environment by operating two-stage beamforming in a correlated channel environment of a massive MIMO antenna system, in which coordinated pre-beamforming for each group based on a sum-mean square error (MSE) is performed using a low-rank dimensionality reduction property of correlated channels or statistical channel information and multi-user precoding based on a weighted sum-MSE, that is, post-beamforming, is also performed.

According to another embodiment of the disclosure, in a correlated channel environment of a massive MIMO antenna system, a base station may obtain correlated channel or statistical channel information as CSIT using a class A codebook, which features non-precoding and single transmission. Further, still another embodiment of the disclosure relates to a communication method in which a base station transmits a plurality of short-term class B beamformed CSI-RSs to a terminal using a low-rank dimensionality reduction property of channel correlation information obtained over the long term and combines the RSs with a plurality of pieces of linear channel information to thus efficiently obtain CSIT, such as hybrid channel information, using a small number of radio resources, thereby maximizing the multi user (MU)-MIMO gain of FD-MIMO or massive MIMO having a two-dimensional antenna array. Class A indicates a method using a non-precoded CSI-RS that is not preprocessed by a base station, and class B indicates a method using a CSI-RS that is beamformed by a base station.

Two-stage beamforming to be illustrated according to various embodiments enables long-term statistical channel information to be reliably reconstructed by transmitting FD-MIMO downlink reference signals horizontally and vertically in a distributed manner That is, the two-stage beamforming according to various embodiments is a technique that can be implemented in a two-dimensional antenna array, rather than a one-dimensional antenna array.

Figure 5:
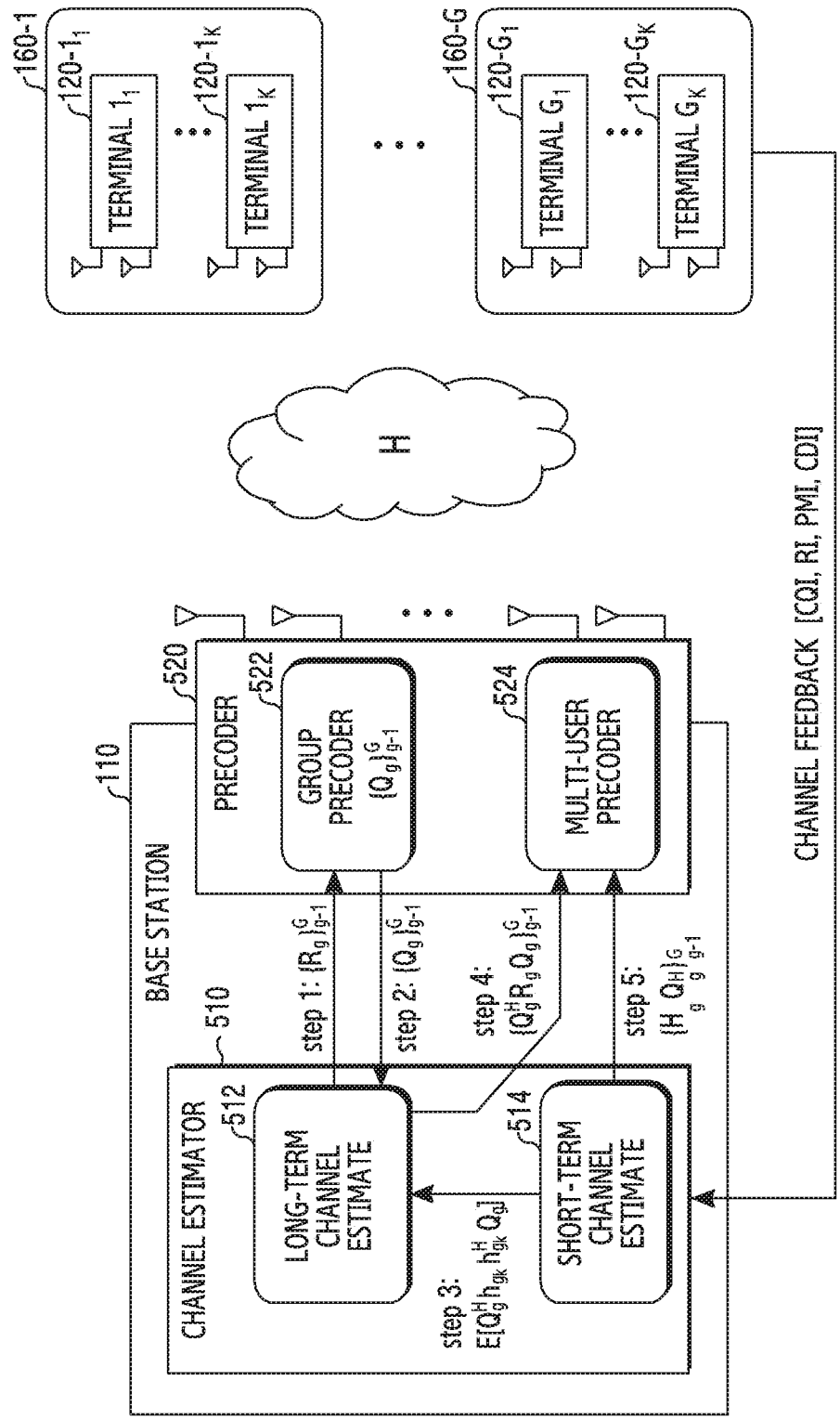
FIG. 5 illustrates a functional configuration for interaction between a base station and terminals in a wireless communication system according to various embodiments of the disclosure.

FIG. 5 illustrates a functional configuration for interaction between a base station and terminals in a wireless communication system according to various embodiments of the disclosure. FIG. 5 illustrates the configuration of a base station 110 and feedback information of terminal groups 160-1 through 160-G.

Referring to FIG. 5, the terminals may be classified into a plurality of G groups 160-1 to 160-G. For example, a first group 160-1 includes K terminals $120\text{-}1_1$ to $120\text{-}1_K$, and a $G^{th}$ group 160-G includes K terminals $120\text{-}G_1$ to $120\text{-}G_K$.

The base station 110 includes a channel estimator 510 and a precoder 520. The channel estimator 510 obtains a long-term channel estimate 512 and a short-term channel estimate 514 using channel feedback received from the terminals. The precoder 520 performs precoding/beamforming using a group precoder 522 on the basis of the long-term channel estimate 512 and performs precoding/beamforming using a multi-user precoder 524 based on both the long-term channel estimate 512 and the short-term channel estimate 514. Here, the group precoder 522 may be referred to as a pre-beamforming or pre-precoder, and the multi-user precoder 524 may be referred to as a post-beamforming or post-precoder.

A fourth-generation mobile communication system, such as LTE, operates on the basis of a multi-carrier multiple access scheme, applies MIMO to improve transmission efficiency, and uses various techniques, such as channel-sensitive scheduling including adaptive modulation and coding (AMC). The system may improve transmission efficiency using the foregoing techniques by adjusting the amount of data transmitted from a plurality of antennas according to channel quality or by user scheduling of selectively transmitting data to users having good channel quality, thereby improving the performance of the system from the aspect of capacity. Since these techniques are mostly controlled on the basis of information on the state of a channel between a base station and a terminal, the base station or the terminal needs to measure the state of the channel between the base station and the terminal. Here, a CSI-RS may be used.

The fourth-generation mobile communication system, such as LTE-A, utilizes a MIMO technique of performing transmission using a plurality of transmission and reception antennas in order to increase the data transmission rate and system capacity. The MIMO technique utilizes a plurality of transmission and reception antennas to transmit a plurality of spatially separated information streams. Spatially separating a plurality of information streams is referred to as spatial multiplexing. Generally, the number of information streams to which spatial multiplexing can be applied may vary depending on the number of antennas of a transmitter and a receiver. The number of information streams that can be simultaneously transmitted by spatial multiplexing is generally referred to as the rank of a transmission. In the MIMO technique supported up to LTE/LTE-A Release 11, spatial multiplexing is supported for eight transmission antennas and eight reception antennas, meaning that a rank of up to eight is supported.

An FD-MIMO system according to various embodiments may be applied to an environment in which 32 or more (e.g., 64 or 256) transmission antennas, which is more than eight transmission antennas supported by the existing LTE/LTE-A MIMO technique, are used in a center frequency band (e.g., 800 MHz or higher, 6 GHz or less) similar to that allowed for the existing LTE/LTE-A system.

The FD-MIMO system according to various embodiments supports transmission of data using dozens of transmission antennas or more. Studies are being conducted on, as a core communication technique for a next-generation wireless communication system, a massive MIMO or FD-MIMO technique in which a base station employing a large number of (e.g., hundreds of) transmission antennas in a two-dimensional array transmits data to a plurality of mobile stations using a multi-user MIMO technique.

The disclosure proposes a CSI-RS transmission technique for implementing an FD-MIMO technique having a two-dimensional planar array as transmission antennas of a base station in an FDD system and an efficient CSI feedback technique of a terminal after reception of a CSI-RS. In LTE-A, based on an existing FDD system, CSI-RS symbols are allocated to resource elements (REs) positioned at carriers of different frequencies and different OFDM symbol times, or are transmitted through different orthogonal codes in order to transmit orthogonal CSI-RSs through respective transmission antenna ports for each downlink slot. When this method is applied to a massive MIMO system, as many CSI-RSs as the number of transmission antennas are required, and thus hundreds of REs need to be allocated for CSI-RS transmission. Accordingly, the number of REs to be allocated for actual data transmission is reduced, resulting in a decrease in downlink transmission capacity. In addition, since a CSI-RS is transmitted at low power via each transmission antenna, CSI-RS reception performance is very low.

Therefore, for the FD-MIMO system that transmits and receives data using a large number of antennas, there is a need to conduct studies on a method for a terminal to efficiently measure a channel between a base station and the terminal using less overhead and to effectively feed the result of a channel state report generated on the basis of the measured radio channel back to the base station. That is, for the massive MIMO system or the FD-MIMO system that uses a large number of transmission antennas operating in the FDD mode, there is a need for a method for efficiently transmitting channel information via all transmission antenna ports using a small number of REs, not proportional to the number of transmission antennas, and for efficiently obtaining, by a base station, channel information measured by a terminal.

It is very important in massive MIMO to reduce complexity in channel estimation and actual beamformer design. As one method to meet both of these two requirements, a two-stage beamforming method may be adopted, in which a pre-beamformer is designed using a channel covariance matrix for each user, an actual channel multiplied by the pre-beamformer is considered as an effective channel, channel state information of the effective channel (effective CSI) is fed back, and a multi-user precoder, that is, a post-beamformer, is designed.

A beamforming technique according to various embodiments has the advantage of reducing a channel dimension. Here, reduction in a channel dimension is caused by designing a pre-beamformer on the basis of statistical information of a channel, that is, a channel covariance matrix $R_g = E[h_{g_k} h_{g_k}^H]$. Specifically, the channel covariance matrix $R_g$ is channel correlation information or statistical channel information $R_g = U_g \Lambda_g U_g^H$ determined using decomposition corresponding to eigen-decomposition or Karhunen-Loeve Transform (KLT). Interference between groups is nullified by taking a null space of eigenspace information $U_g$ of a group other than a $g^{th}$ group from the statistical channel information, and beamforming for each group having a reduced dimension is performed. Subsequently, a group-specific CSI-RS multiplied by a group beamforming matrix is transmitted, multi-user precoding is performed on the basis of channel feedback information (e.g., a rank indicator (RI), a precoding matrix indicator (PMI), and a codebook) having reduced overhead based on an effective short-term CSI, and user scheduling is performed on the basis of the multi-user precoding.

In order to solve the problem of requiring an excessive number of reference signals in the massive MIMO or FD-MIMO system, transmission antennas in a two-dimensional array are divided according to a vertical axis and a horizontal axis, and two reference signals mapped to the number of antennas on the respective axes may be transmitted. Unlike the current LTE or LTE-A system, the vertical CSI-RS according to various embodiments is transmitted in the form of a beamformed CSI-RS, the terminal determines and feeds back the most suitable vertically/horizontally matched channel direction information (CDI) or the codebook index, and the base station obtains channel information for the FD-MIMO system by performing the Kronecker product of vertical/horizontal channel feedback information as Equation 1 below.

$$H_{3D} \approx \hat{H}_{3D} = H_h \otimes H_v \qquad \text{[Equation 1]}$$

In Equation 1, $H_{3D}$ denotes all channels, $\hat{H}_{3D}$ denotes all estimated channels, $H_h$ denotes a horizontal channel, and $H_v$ denotes a vertical channel.

However, in this case, since the terminal quantizes imperfect CSI for each axis and transmits the CSI in the form of a codebook index or a PMI, loss of the CSI mapped to each axis may occur. Therefore, since the CSI for the transmission antennas in the two-dimensional array is simply reconstructed using the Kronecker product, error in the CSI is increased by the loss of the CSI, thus reducing the spatial multiplexing gain of the multi-user MIMO. In contrast, a two-stage beamforming technique in a single cell can maximize a spatial multiplexing gain only in a small number of groups when long-term statistical channel information (e.g., CSI) is obtained.

However, the current two-stage beamforming technique does not consider a multi-cell environment. That is, the current two-stage beamforming technique has been discussed mainly on the assumption of a single-cell environment. Therefore, when groups having similar pieces of statistical channel information are in adjacent cells among multiple cells, it is not easy to obtain statistical channel information about interference channels between cells and to control interference between groups, and thus significant performance deterioration is expected. In addition, when statistical channel information $R_g = E[h_{g_k} h_{g_k}^H]$ is collected on the basis of a sounding reference signal (SRS) in the FDD system, the statistical channel information is inaccurate due to an interference signal caused by pilot contamination in the multi-cell, and an operation of correcting the difference using different FDD uplink/downlink center frequencies is required. These problems may cause an error in eigenspace $R_g = U_g \Lambda_g U_g^H$ of a statistical channel. When user grouping is performed on the basis of erroneous information and two-stage beamforming that requires group beamforming is performed, a serious error in channel estimation and interference between user groups may occur from the pre-beamforming stage.

Furthermore, perfect channel estimation for channel covariance information necessary for two-stage beamforming is very difficult to perform in an actual FDD system. Also, channel covariance, that is, statistical channel information, may have a channel estimation error. A block diagonalization (BD)-based pre-beamformer based on statistical channel information having a channel estimation error may have performance deterioration in terms of transmission rate, like a zero forcing (ZF)-based nulling technique.

Also, similar to the ZF-based nulling technique, a conventional BD-based pre-beamformer does not consider noise power statistics or inter-cell interference, and thus the BD-based pre-beamformer exhibits high performance only in a high signal-to-noise ratio (SNR) environment and exhibits performance deterioration due to a noise enhancement effect in a low-to-medium SNR environment. The BD-based pre-beamformer has significant technical limitations since the performance deterioration is inevitably more serious when the number of groups having different channel covariances increases or when the average number of terminals per group increases. Thus, the technical limitations are considerable.

In addition, when groups receiving data from different serving cells in a multi-cell environment have similar channel similarities, an operation of controlling inter-cell/inter-group interference using an eigenspace of statistical channel information is required, because cell capacity and frequency efficiency are increased by controlling interference.

Moreover, when groups receiving data from different serving cells have almost the same channel similarity, it may be more advantageous to alleviate the load of coordinated beamforming by performing per-group handover to a base station having a low load rather than performing group pre-beamforming using an eigenspace of statistical channel information.

Thus, the disclosure proposes an improved two-stage beamforming technique that is suitable for cooperative communication in a multi-cell environment. Further, the disclosure proposes a method of operating multiple modes including the following two modes in order to obtain the gain of two-stage beamforming when operating the FD-MIMO system, which is currently discussed as a study item (SI) or work item (WI) as a massive MIMO technology in the 3 GPP standard, in the FDD mode. When a particular terminal does not obtain long-term statistical channel information, a base station may classify the terminal as operating in a first mode, and may allocate a subband/RB matching a general FD-MIMO standard discussed in a standard corresponding to the first mode on a frequency axis for terminals corresponding to the first mode. When the base station obtains statistical channel information of a particular terminal, the base station may classify the terminal as a second mode and may separately allocate and operate a subband/RB suitable for two-stage beamforming.

The first mode is described below. The first mode is defined for a case where a terminal performs initial access or a case where a terminal does not yet obtain long-term channel information due to a group change caused by movement. According to the first mode, one-stage beamforming is performed. That is, before obtaining or re-obtaining long-term channel covariance about each terminal, a base station obtains short-term channel information and performs a single user (SU)-MIMO or MU-MIMO operation without the help of long-term channel information. A terminal may measure not only short-term channel information (e.g., a PMI) but also averaged long-term channel information from an RE for a CSI-RS allocated for each vertical/horizontal antenna port allocated for each sub-band or resource block (RB) and may feed the long-term channel information to the base station in the form of a PMI.

According to another embodiment, the CSI-RS allocated for each vertical/horizontal antenna port allocated for each sub-band or RB may be a non-precoding CSI-RS corresponding to class A.

According to another embodiment, the long-term channel information may be generated by the base station. The short-term channel information is provided for a normal MIMO mode. When the long-term channel information is obtained, the terminal may be switched to the second mode for two-stage beamforming and may be allocated a group-specific CSI-RS to which pre-beamforming by group is applied.

According to another embodiment, the long-term channel information may be generated by the base station. The short-term channel information is provided for the normal MIMO mode. When the long-term channel information is obtained, the terminal may be switched to the second mode for obtaining hybrid CSI information and may be simultaneously allocated a plurality of beamformed CSI-RSs corresponding to class B.

The second mode is described below. When long-term channel information is obtained, a terminal operates according to two-stage beamforming. Further, the terminal may perform MU-MIMO or cooperative communication (e.g., coordinated beamforming (CB), joint processing (JP), or joint transmission (JT)) on the basis of the long-term channel information. Since the long-term channel information is obtained, a base station generates a pre-beamformer based on the long-term channel information and transmits a group-specific CSI-RS reflecting the reduced dimensionality of a channel correlation. Here, the group-specific CSI-RSs may not be classified according to vertical/horizontal antennas. The terminal measures short-term channel information using the group-specific CSI-RS and feeds back the short-term channel information to the base station in the form of a PMI. The base station may store and monitor the long-term channel information by averaging the short-term channel information.

According to another embodiment, when the long-term channel information is obtained, the base station may generate a pre-beamformer based on the long-term channel information and may transmit a plurality of beamformed CSI-RSs.

The terminal feeds back CQI (e.g., signal to interference noise ratio (SINR)) information extracted by averaging the group-specific CSI-RSs to the base station, thereby providing information required for long-term scheduling and short-term rescheduling that the base station needs for cooperative communication.

More specifically, in a scheduling process of the base station, the base station may determine a MIMO transmission method suitable for cooperative communication for each sub-band on the basis of CQI (e.g., SINR) information provided by terminals averaging group-specific CSI-RS information. The target base station may divide an SINR range of terminals into three areas and may allocate single-cell MIMO transmission (e.g., SU-MIMO or MU-MIMO), CB, and JP/JT MIMO transmission methods in order from an area having a higher SINR. The target base station may determine a MIMO transmission method for a corresponding area according to the SINR of each terminal as a MIMO transmission method for the terminal. That is, when the SINR is high, because the terminal receives less interference from a neighboring base station, it is reasonable that the target base station performs single-cell MIMO transmission without inter-cell cooperation. When the SINR belongs to an intermediate area, since the strength of a transmitted signal is similar to the strength of interference, it is reasonable that the target base station performs CB with a neighboring base station. When the SINR is low, since interference from a neighboring base station is substantial, it is reasonable that the target base station performs JP by sharing data with the neighboring base station.

Regarding the channel information averaged by measuring the group-specific CSI-RSs to which pre-beamforming is applied, the long-term channel information from the group-specific CSI-RSs to which pre-beamforming is applied may be compared with the long-term channel information obtained through the first mode, thereby determining whether statistical channel information is changed or whether the second mode is maintained. During the operation in the second mode, the long-term channel information may be changed due to movement of the terminal, thus destroying channel similarity. In this case, the base station may switch the terminal to the first mode and may perform control to repeat the procedure for obtaining long-term channel information.

As described above, a terminal may operate in the first mode or in the second mode depending on whether long-term channel information is obtained. In this case, according to various embodiments, a terminal operating in the first mode and a terminal operating in the second mode may use different frequency subbands or different RBs. To this end, the base station may identify the operation mode of a terminal and may allocate a subband or RB corresponding to the operation mode.

Figure 6:
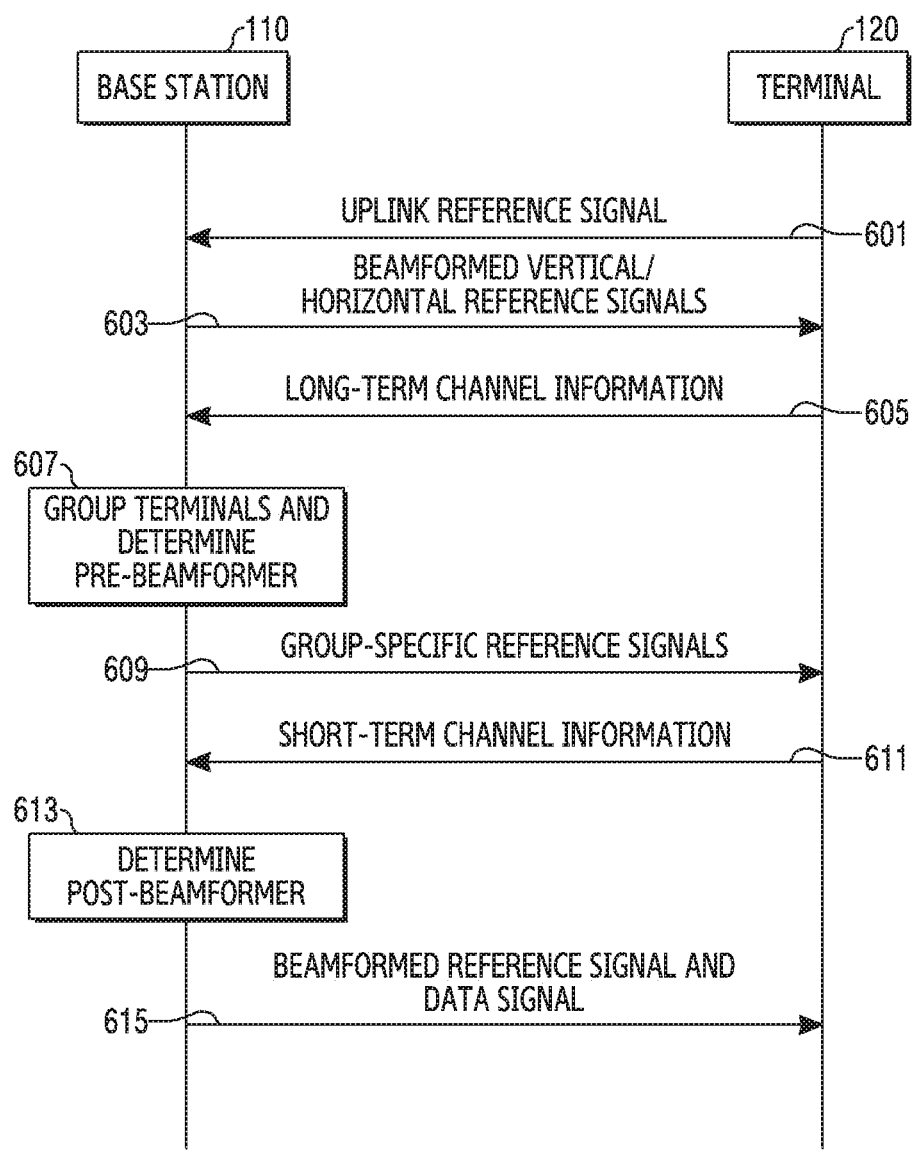
FIG. 6 illustrates an operating method of a base station and a terminal in a wireless communication system according to various embodiments of the disclosure.

In an operation according to the second mode, an operating method of a base station and a terminal for two-stage beamforming according to various embodiments is shown in FIG. 6. FIG. 6 illustrates an operating method of a base station and a terminal in a wireless communication system according to various embodiments of the disclosure. FIG. 6 illustrates the operations of a base station 110 and a terminal 120. However, the operating method illustrated in FIG. 6 may be similarly applied to a procedure between the base station 110 and a plurality of terminals according to another embodiment.

Referring to FIG. 6, in operation 601, the terminal 120 transmits an uplink reference signal to the base station 110. Here, the uplink reference signal may be an SRS. The terminal 120 may transmit the generated reference signal using a sequence allocated from the base station 110. Accordingly, the base station 110 may identify an interference relationship between the terminal 120 and another terminal using uplink reference signals. That is, the base station 110 receives uplink reference signals from the terminal 120 and at least one other terminal in order to identify an interference relationship between the terminals.

In operation 603, the base station 110 transmits beamformed vertical/horizontal reference signals to the terminal 120. To this end, the base station 110 determines the beamformer to be applied to the vertical/horizontal reference signals on the basis of the result of measurement of the uplink reference signal. That is, the base station 110 transmits vertical reference signals and horizontal reference signals that are generated on the basis of the interference relationship between the terminals. Here, the beamformer may include a beamforming matrix based on a discrete fourier transform (DFT). Here, the reference signals may include a CSI-RS.

In operation 605, the terminal 120 transmits long-term channel information to the base station 110. That is, the terminal 120 generates long-term channel information using the beamformed vertical/horizontal reference signals and feeds back the long-term channel information. Accordingly, the base station 110 receives the long-term channel information determined using the vertical reference signals and the horizontal reference signals. Here, the long-term channel information includes the covariance of a channel Here, the long-term channel information may be configured to be divided according to the horizontal area and the vertical area of an antenna, or may be configured without division. Accordingly, the base station 110 may obtain the long-term channel information about the terminal 120, and the terminal 120 may operate in the second mode.

In operation 607, the base station 110 groups a plurality of terminals including the terminal 120 and determines a pre-beamformer for each group. Here, the grouping is performed on the basis of the long-term channel information of each terminal. For example, terminals having the same or similar pieces of long-term channel information may be classified into one group. Alternatively, terminals having the same or similar center angles and angular spreads may be classified into one group. Further, for cooperative communication, the grouping may be performed in consideration of at least one terminal located at the boundary of at least one neighboring cell. In addition, the pre-beamformer may include a group-specific beamforming matrix and may be determined for various purposes. According to one embodiment, the pre-beamformer may be determined to minimize a sum-mean square error (MSE). Further, the pre-beamformer may be determined additionally in consideration of interference between neighboring cells. The pre-beamformer functions to reduce the number of eigenspaces to be considered among the eigenspaces of the channel. That is, the pre-beamformer may reduce the dimensionality of the channel to eigenspaces having an eigenvalue of a threshold value or greater or to eigenspaces corresponding to the top N eigenvalues.

According to another embodiment, the plurality of beamformed CSI-RSs may include a group-specific beamforming matrix, and may be determined for various purposes.

In operation 609, the base station 110 transmits a group-specific reference signal. That is, the base station 110 transmits group-specific reference signals beamformed by the beamformer generated on the basis of the long-term channel information. Accordingly, the terminal 120 may determine short-term channel information using the group-specific reference signal. Here, the group-specific reference signal is beamformed by a pre-beamformer of the group to which the terminal 120 belongs, and is then transmitted.

According to another embodiment, the terminal 120 may determine short-term hybrid channel information using the plurality of beamformed CSI-RSs. Here, the plurality of beamformed CSI-RSs is beamformed by the pre-beamformer of the group to which the terminal 120 belongs and is then transmitted.

In operation 611, the terminal 120 transmits the short-term channel information to the base station 110. Accordingly, the base station 110 receives the short-term channel information determined using the group-specific reference signals. The short-term channel information may include channel state information or quantized channel information. Here, in order to quantize the channel information, the terminal 120 may generate a codebook corresponding to a group considering channels having a dominant eigenvalue and may generate the quantized channel information using the codebook.

In operation 613, the base station 110 determines a post-beamformer. The post-beamformer includes a terminal-specific beamforming matrix. The post-beamformer may be determined for various purposes. According to one embodiment, the post-beamformer may be determined in order to minimize a weighted minimum mean square error (MMSE). To this end, the base station 110 may determine a post-beamformer for the terminal 120 on the basis of intra-group interference, inter-group interference, noise power, or the like.

According to another embodiment, the base station 110 may determine a post-beamformer on the basis of hybrid channel information.

In operation 615, the base station 110 transmits a reference signal and a data signal, which are beamformed, to the terminal 120. That is, the base station 110 transmits the data signal beamformed by a beamformer generated on the basis of the short-term channel information. Here, the data signal may also be beamformed by the beamformer generated on the basis of the long-term channel information. The reference signal and the data signal are beamformed by the same beamforming matrix. Here, the beamforming matrix is a beamformer in which a pre-beamformer and a post-beamformer are combined. The reference signal may include a demodulation reference signal (DM-RS).

In an embodiment described with reference to FIG. 6, the terminal 120 receives a group-specific reference signal from the base station 110. Here, the terminal 120 may measure, on average, a CSI-RS for each group to which pre-beamforming based on a sum-MSE is applied, and may provide CQI information indicating the measurement result to the base station 110. Accordingly, the base station 110 may utilize the CQI information to achieve network utility, multi-cell sum utility, or network sum-proportional fair (PF) maximization. That is, the terminal 120 may provide long-term CQI information for network utility determination, multi-cell sum utility determination, or network sum-PF maximization. That is, the base station 110 may utilize long-term channel information, which is generated using the group-specific reference signal, for subsequent scheduling.

In the embodiment of FIG. 6, the pre-beamformer is a beamformer for a group and may be referred to as an inter-group interference mitigation beamformer/precoder/beamforming matrix, a group-level precoder, a first beamformer/precoder/beamforming matrix, a primary beamformer/precoder/beamforming matrix, or the like. In addition, the post-beamformer is a beamformer for a terminal, and may be referred to as an inter-user interference mitigation beamformer/precoder/beamforming matrix, a user-level precoder, a second beamformer/precoder/beamforming matrix, a secondary beamformer/precoder/beamforming matrix, or the like.

As described in an embodiment with reference to FIG. 6, the terminal 120 may transition to the second mode, supporting two-stage beamforming, by obtaining long-term channel information in the first mode. As one operation for obtaining the long-term channel information, an operation of transmitting an uplink reference signal, for example, an SRS, is performed. As a preparatory operation for efficiently obtaining the downlink long-term channel information in the first mode, transmission of an SRS will be described in detail below.

As described above, it is not effective to use only an SRS in generating downlink long-term channel information. However, the SRS is significantly helpful for an operation of measuring downlink long-term channel information necessary to operate a terminal in a two-stage beamforming mode, that is, the second mode, or determining an interference relationship necessary to perform cooperative communication (e.g., coordinated multi-point (CoMP) communication) by obtaining average strength information of the SRS or dominant angle information of an SRS average channel. In addition, information measured over a long term may be helpful in effectively providing reliable statistical channel information so as to identify a beamformed downlink reference signal for each vertical/horizontal antenna on the basis of location information of the terminal. Therefore, as shown in FIG. 7A, an operation in which terminals transmit an SRS is used.

Figure 7A:
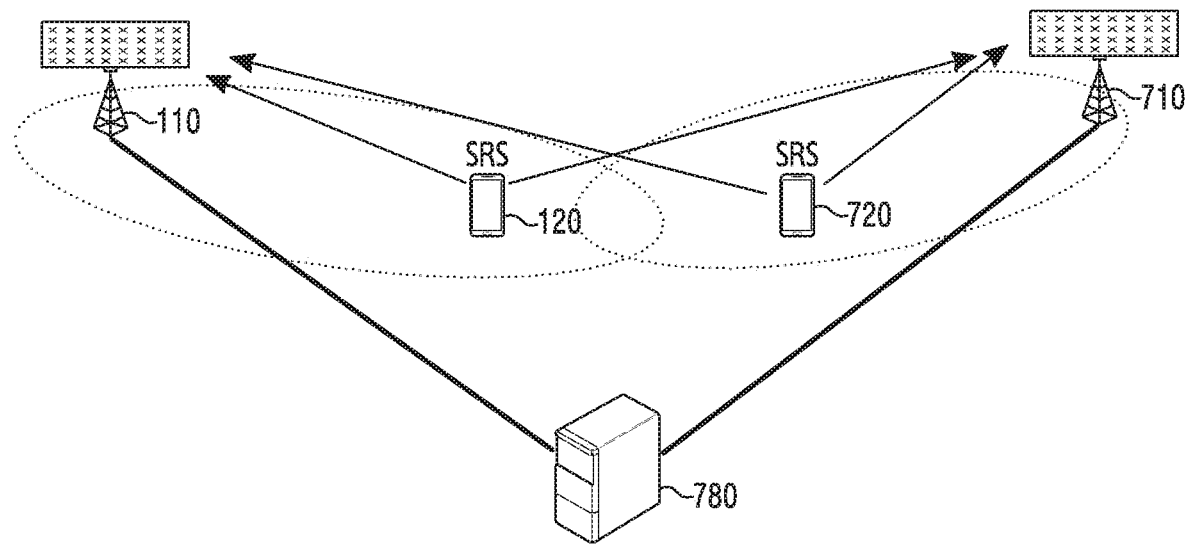
FIG. 7A illustrates the transmission of a reference signal by terminals in a wireless communication system according to various embodiments of the disclosure.

FIG. 7A illustrates the transmission of a reference signal by terminals in a wireless communication system according to various embodiments of the disclosure. Referring to FIG. 7A, a terminal 120 and a terminal 720 transmit SRSs, and a base station 110 as a serving cell and a base station 710 as an interference cell receive the SRSs. The base station 110 and the base station 710 may estimate uplink channels of the terminal 120 and the terminal 720 using the SRSs. Here, the base station 110 and the base station 710 may determine an interference relationship between the terminal 120 and the terminal 720. The base station 110 and the base station 710 provide information about the interference relationship to a central station 780.

As described with reference to FIG. 7A, the base stations 110 and 710 may identify in advance a neighboring cell list of terminals (e.g., the terminal 120 and the terminal 720) located in a cell-edge area using CRS-based RS received power (RSRP), and the central station 780 may recognize in advance the particular terminals located in the cell-edge area from the base stations 110 and 710 and may recognize in advance an RE position in an uplink RB allocated for the SRSs and a code sequence allocated to the SRSs. The central station 780 may schedule uplink resources to minimize neighboring-cell interference in the terminals located in the cell-edge area on the basis of the information collected from the base stations 110 and 710 or may request allocation of orthogonal sequences to minimize SRS interference between the terminals located in the cell-edge area. This procedure is for minimizing a procedure for obtaining long-term channel information and for effectively obtaining long-term channel information. Further, this procedure is for obtaining in advance the average strength of SRSs and dominant angle information of each horizontal/vertical antenna and for efficiently transmitting horizontally/vertically DFT-beamformed downlink CSI-RSs to terminals operating in the first mode so that a base station implements an efficient cooperative communication mode in an FDD system.

As shown in FIG. 7A, the system according to various embodiments may include the central station 780 and the base station 710. Here, the base station 110 may perform cooperative communication with the base station 710, in which case the procedure illustrated in FIG. 6 may be modified as shown in FIG. 7B.

Figure 7B:
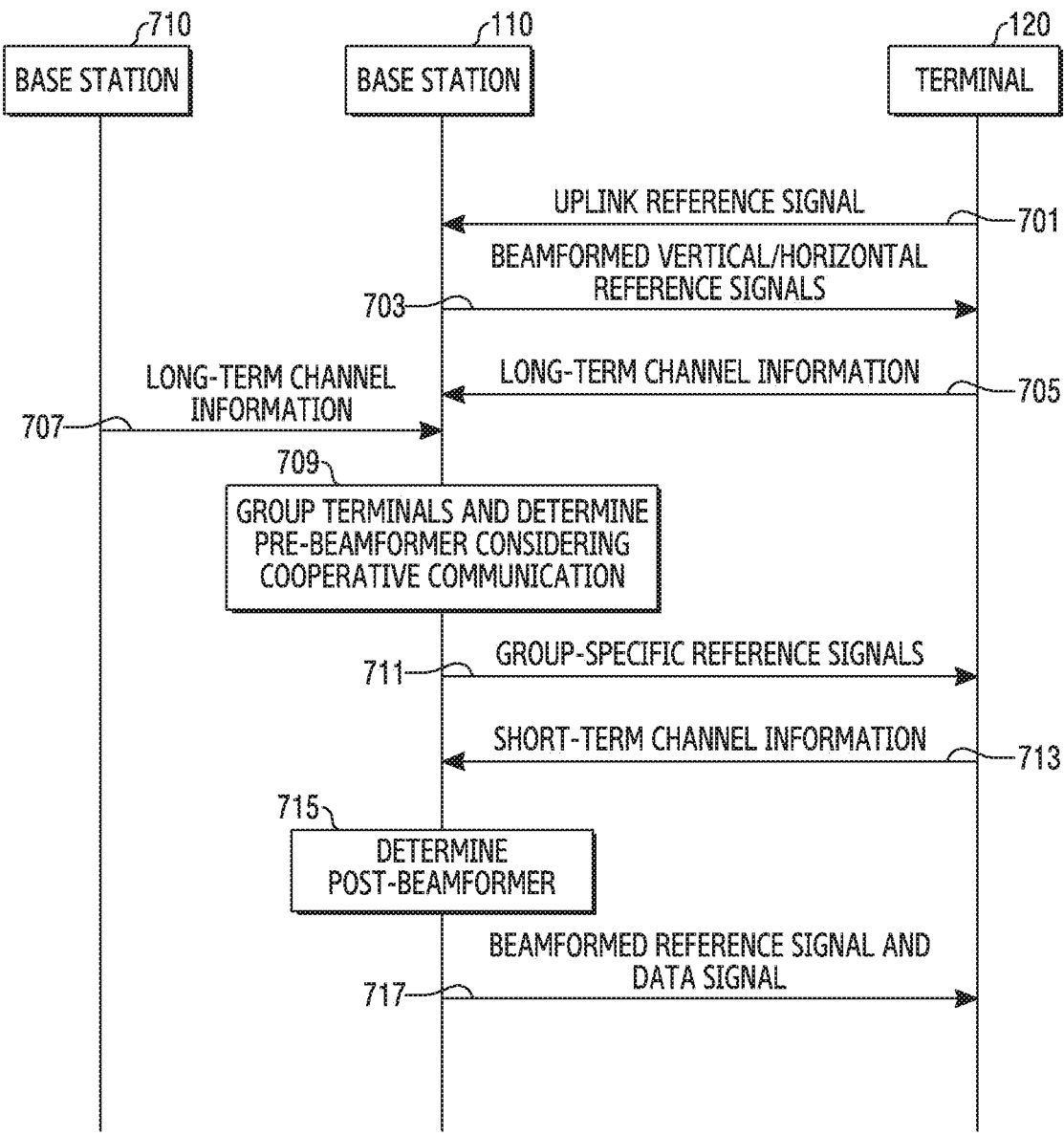
FIG. 7B illustrates an operating method of a base station and a terminal in consideration of cooperative communication in a wireless communication system according to various embodiments of the disclosure.

FIG. 7B illustrates an operating method of a base station and a terminal in consideration of cooperative communication in a wireless communication system according to various embodiments of the disclosure. FIG. 7B illustrates the operations of a base station 110 and a terminal 120. However, the operating method illustrated in FIG. 7B may be similarly applied to a procedure between the base station 110 and a plurality of terminals according to another embodiment.

Referring to FIG. 7B, in operation 701, the terminal 120 transmits an uplink reference signal to the base station 110. Here, the uplink reference signal may be an SRS. The terminal 120 may transmit the generated reference signal using a sequence allocated from the base station 110. Accordingly, the base station 110 may identify an interference relationship between the terminal 120 and another terminal using uplink reference signals. That is, the base station 110 receives uplink reference signals from the terminal 120 and at least one other terminal so as to identify an interference relationship between the terminals.

In operation 703, the base station 110 transmits beamformed vertical/horizontal reference signals to the terminal 120. To this end, the base station 110 determines a beamformer to be applied to the vertical/horizontal reference signals on the basis of the result of measurement of the uplink reference signal. That is, the base station 110 transmits vertical reference signals and horizontal reference signals that are generated on the basis of the interference relationship between the terminals. Here, the beamformer may include a beamforming matrix based on a DFT. Here, the reference signals may include a CSI-RS. Here, although not shown, the terminal 120 may receive vertical/horizontal reference signals from the base station 710.

In operation 705, the terminal 120 transmits long-term channel information to the base station 110. That is, the terminal 120 generates long-term channel information using the beamformed vertical/horizontal reference signals and feeds back the long-term channel information. Accordingly, the base station 110 receives the long-term channel information, determined using the vertical reference signals and the horizontal reference signals. Here, the long-term channel information includes the covariance of a channel Here, the long-term channel information may be configured to be divided according to the horizontal area and the vertical area of an antenna, or may be configured without division. Accordingly, the base station 110 may obtain the long-term channel information about the terminal 120, and the terminal 120 may operate in the second mode. Here, although not shown, the terminal 120 may further transmit the result of measuring the vertical/horizontal reference signals of the base station 710, that is, long-term channel information about the base station 710. That is, the terminal 120 may measure the vertical/horizontal reference signals of the interference cell over a long term and may feed back the measurement result to the base station 110, thereby enabling cooperative communication. Further, the long-term channel information about the base station 710 may be subsequently further fed back, either periodically or on the basis of an event.

In operation 707, the base station 110 receives long-term channel information of another terminal (e.g., a terminal 720) from the base station 710. That is, the base station 110 receives long-term channel information of at least one terminal being served by the base station 710. The long-term channel information of the other terminal is used for terminal grouping in consideration of cooperative communication.

In operation 709, the base station 110 groups a plurality of terminals including the terminal 120 in consideration of cooperative communication and determines a pre-beamformer in consideration of cooperative communication. That is, for cooperative communication, the grouping may be performed considering at least one terminal located in the edge of at least one neighboring cell. The pre-beamformer may include a group-specific beamforming matrix and may be determined to minimize a sum-MSE. Further, the pre-beamformer may be determined additionally in consideration of interference between neighboring cells. The pre-beamformer functions to reduce the number of eigenspaces to be considered among the eigenspaces of the channel That is, the pre-beamformer may reduce the dimensionality of the channel to eigenspaces having an eigenvalue of a threshold value or greater or to eigenspaces corresponding to the top N eigenvalues.

In operation 711, the base station 110 transmits a group-specific reference signal. That is, the base station 110 transmits group-specific reference signals beamformed by the beamformer generated on the basis of the long-term channel information. Accordingly, the terminal 120 may determine short-term channel information using the group-specific reference signal. Here, the group-specific reference signal is beamformed by the pre-beamformer of the group to which the terminal 120 belongs and is then transmitted.

In operation 713, the terminal 120 transmits the short-term channel information to the base station 110. Accordingly, the base station 110 receives the short-term channel information determined using the group-specific reference signals. The short-term channel information may include channel state information or quantized channel information. Here, in order to quantize the channel information, the terminal 120 may generate a codebook corresponding to a group considering channels having a dominant eigenvalue and may generate the quantized channel information using the codebook.

In operation 715, the base station 110 determines a post-beamformer. The post-beamformer includes a terminal-specific beamforming matrix. The post-beamformer may be determined for various purposes. According to one embodiment, the post-beamformer may be determined so as to minimize a weighted MMSE. To this end, the base station 110 may determine a post-beamformer for the terminal 120 on the basis of intra-group interference, inter-group interference, a magnitude of noise, or the like.

In operation 717, the base station 110 transmits a reference signal and a data signal, which are beamformed, to the terminal 120. Here, the data signal is a signal considering cooperative communication. Thus, for example, although not shown, the terminal 120 may receive a data signal from both the base station 110 and the base station 710. That is, the base station 110 transmits the data signal beamformed by a beamformer generated on the basis of the short-term channel information. Here, the data signal may also be beamformed by the beamformer generated on the basis of the long-term channel information. The reference signal and the data signal are beamformed by the same beamforming matrix. Here, the beamforming matrix is a beamformer in which a pre-beamformer and a post-beamformer are combined. The reference signal may include a DM-RS.

As described in the embodiment with reference to FIG. 6, the terminal 120 may transition to the second mode, supporting two-stage beamforming, by obtaining long-term channel information in the first mode. As one operation for obtaining the long-term channel information, an operation of transmitting a beamformed vertical/horizontal reference signal, for example, a beamformed CSI-RS, is performed. Transmission of a beamformed vertical/horizontal CSI-RS, as a preparatory operation for efficiently obtaining the downlink long-term channel information in the first mode, will be described in detail below.

A beamformed CSI-RS may be transmitted and measured on a non-precoding basis like a conventional CSI-RS. However, to efficiently obtain downlink statistical channel information, DFT-based beamforming transmission suitable for each horizontal/vertical direction may be performed on the basis of the average channel strength of an uplink SRS of a terminal and dominant angle information about each horizontal/vertical antenna direction, and feedback information may be generated by measuring accurate statistical channel information of a downlink for each horizontal/vertical antenna. A DFT-beamformed CSI-RS may be assigned for each vertical/horizontal antenna. Therefore, the DFT-beamformed CSI-RS may not be used to distinguish a group according to the statistical channel information but may be used to implement 3D beamforming based on a horizontal/vertical CSI-RS only on the basis of approximate dominant angle information about each horizontal/vertical antenna. Further, if it is possible to distinguish a terminal on the edge of a serving cell from a terminal on the edge of an interference cell through uplink SRSs, statistical channel information may be effectively obtained by transmitting a horizontal/vertical CSI-RS via the downlink.

Figure 8:
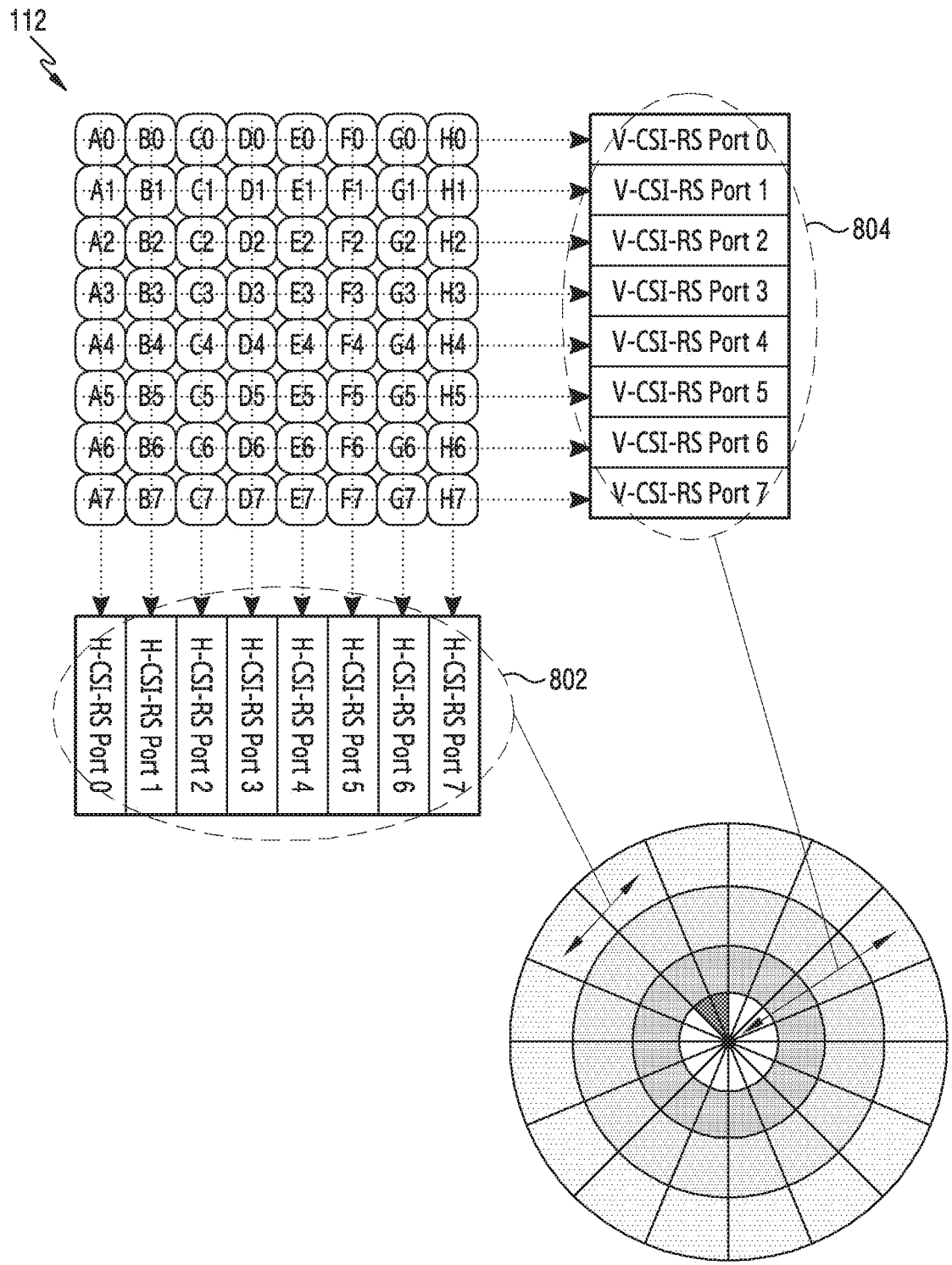
FIG. 8 illustrates a horizontal reference signal and a vertical reference signal in a wireless communication system according to various embodiments of the disclosure.

That is, if CSI-RSs are allocated for all of the 8×8 (=64) transmission antennas in FDD, there is a lack of REs to be allocated for data. Therefore, as shown in FIG. 8, the base station uses a horizontal CSI-RS (H-CSI-RS) and a vertical CSI-RS (V-CSI-RS). FIG. 8 illustrates a horizontal reference signal and a vertical reference signal in a wireless communication system according to various embodiments of the disclosure. Referring to FIG. 8, H-CSI-RSs 802 are reference signals corresponding to columns of an antenna array 112, wherein one H-CSI-RS is transmitted for one column. Further, V-CSI-RSs 804 are reference signals corresponding to rows of the antenna array 112, wherein one V-CSI-RS is transmitted for one row. When eight REs are allocated for each of the H-CSI-RSs 802 and the V-CSI-RSs 804, the allocated quantity of REs for the CSI-RSs may be reduced, and a terminal can transmit an 8×8 long-term PMI for the H-CSI-RSs and an 8×8 long-term PMI for the V-CSI-RSs instead of transmitting a 64×64 long-term PMI.

Accordingly, as shown in FIG. 8, the terminal may estimate a horizontal-direction change in a channel using the H-CSI-RSs 802 and a vertical-direction change in the channel using the V-CSI-RSs 804. Thus, the terminal can considerably reduce the amount of feedback overhead and can provide more accurate channel information using the same number of bits.

When short-term channel information is estimated using a Kronecker product in a short-term channel, there is a serious error in CSI estimation using limited bits and inter-user interference cannot be effectively controlled, thus reducing spectral efficiency. Here, channel covariance measured in the vertical/horizontal direction using an H-CSI-RS and a V-CSI-RS is defined as Equation 2 and Equation 3 below.

$$R_{v,l} = U_{V,l} \Lambda_{V,l} U_{V,l}^H \qquad \text{[Equation 2]}$$

In Equation 2, $R_{v,l}$ denotes the channel covariance of a vertical channel, $U_{v,l}$ denotes a matrix representing the eigenspace of the vertical channel, and $A_{v,l}$ denotes a diagonal matrix including eigenvalues of the vertical channel as diagonal elements.

$$R_{H,l,g} = U_{H,l,g} \Lambda_{H,l,g} U_{H,l,g}^H \qquad \text{[Equation 3]}$$

In Equation 3, $R_{H,l,g}$ denotes the channel covariance of a horizontal channel, $U_{H,l,g}$ denotes a matrix representing the eigenspace of the horizontal channel, and $A_{H,l,g}$ denotes a diagonal matrix including eigenvalues of the horizontal channel as diagonal elements.

Total channel covariance may be obtained by a base station calculating a Kronecker product. Specifically, the total channel covariance may be defined as Equation 4 below.

$$\begin{aligned} R_{l,g} &= E[h_{l,g_k} h_{l,g_k}^H] \\ &= R_{H,l,g} \otimes R_{V,l} \\ &= (U_{H,l,g} \otimes U_{V,l})(\Lambda_{H,l,g} \otimes \Lambda_{V,l})(U_{H,l,g}^H \otimes U_{V,l}^H) \end{aligned} \qquad \text{[Equation 4]}$$

In Equation 4, $R_{l,g}$ denotes the channel covariance of all channels, $h_{l,g_k}$ denotes a channel for a $g_k{}^{th}$ terminal, $R_{H,l,g}$ denotes the channel covariance of a horizontal channel, $R_{V,l}$ denotes the channel covariance of a vertical channel, $U_{V,l}$ denotes a matrix representing the eigenspace of the horizontal channel, $U_{V,l}$ denotes a matrix representing the eigenspace of the vertical channel, $\Lambda_{H,l,g}$ denotes a diagonal matrix including eigenvalues of the horizontal channel as diagonal elements, and $A_{V,l}$ denotes a diagonal matrix including eigenvalues of the vertical channel as diagonal elements.

As described above, when a long-term PMI for channel covariance is estimated for each vertical/horizontal antenna port, long-term channel information contains hardly any estimation error, unlike short-term channel information, and may be provided with considerably reduced overhead of an 8×8 size. In addition, such operations can obtain downlink statistical channel information of an interference cell via each vertical/horizontal antenna and can effectively feed back the downlink statistical channel information to a terminal located in a cell-edge area in a multi-cell environment using reduced overhead.

Figure 9:
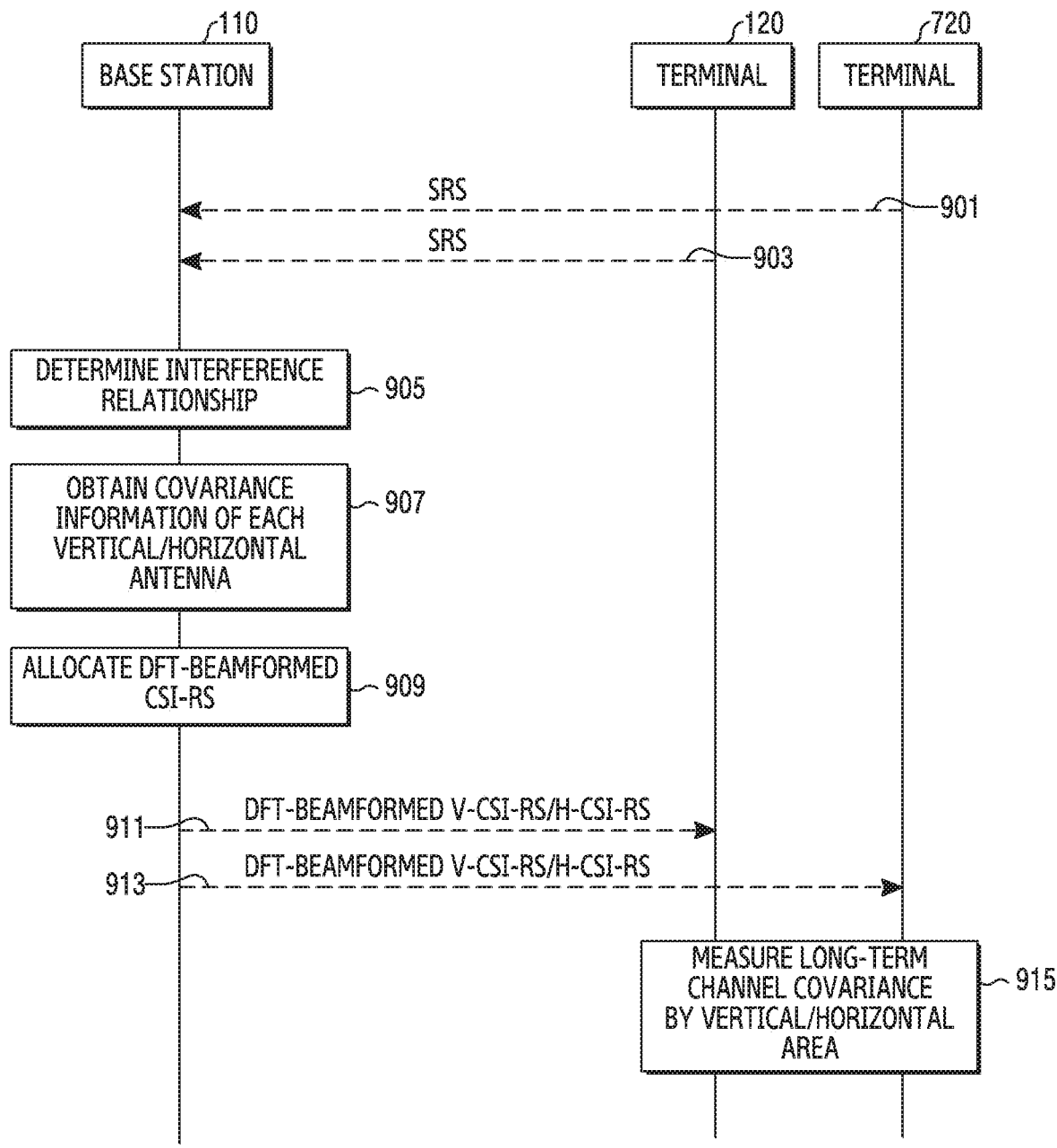
FIG. 9 illustrates an operating method for obtaining long-term channel information in a wireless communication system according to various embodiments of the disclosure.

As described above, long-term channel information may be obtained. An operating method of a base station and a terminal for obtaining long-term channel information is illustrated in FIG. 9. FIG. 9 illustrates an operating method for obtaining long-term channel information in a wireless communication system according to various embodiments of the disclosure. FIG. 9 illustrates an operating method of a base station 110, a terminal 120, and a terminal 720.

Referring to FIG. 9, in operations 901 and 903, the terminal 120 and the terminal 720 transmit an SRS. Here, the terminal 120 and the terminal 720 may transmit the SRS using a pre-allocated sequence.

In operation 905, the base station 110 recognizes an interference relationship. Specifically, the base station 110 may obtain information about an SRS sequence of a terminal located on the edge of a neighboring cell from a central station and may recognize an interference relationship using the information about the SRS sequence. That is, the base station 110 may measure an average strength on the basis of the information about the SRS sequence, thereby recognizing the interference relationship in advance.

In operation 907, the base station 110 obtains covariance information of each vertical/horizontal antenna. That is, the base station 110 obtains covariance information or dominant angle information of each vertical/horizontal antenna on the basis of an uplink SRS. That is, the base station 110 obtains channel covariance information or dominant angle information from SRSs of a terminal being served (e.g., the terminal 120) and a neighboring-cell terminal (e.g., the terminal 720) on the basis of the SRS measurement result. Here, the uplink information is approximate and is determined separately for a vertical antenna and a horizontal antenna. Also, as described above, average-uplink-strength information about a terminal located on the edge of an interference cell and dominant-angle information of each horizontal/vertical antenna may be obtained.

In operation 909, the base station 110 allocates a DFT-beamformed CSI-RS for each horizontal/vertical antenna. Specifically, the base station 110 determines a DFT beamformer for the horizontal/vertical antenna that best matches the SRS of each terminal and allocates the determined DFT beamformer for the horizontal/vertical antenna to the terminal. Here, the DFT beamformer for each horizontal/vertical antenna includes a beamformer for a V-CSI-RS and a beamformer for an H-CSI-RS.

In operations 911 and 913, the base station 110 transmits DFT-beamformed CSI-RSs. Different DFT beamformers may be applied to a CSI-RS to be transmitted to the terminal 120 and a CSI-RS to be transmitted to the terminal 720. Here, the DFT-beamformed CSI-RSs are divided into V-CSI-RSs and H-CSI-RSs.

In operation 915, the terminal 120 and the terminal 720 measure long-term channel covariance by vertical/horizontal areas. That is, the terminal 120 and the terminal 720 determine vertical channel covariance and horizontal channel covariance using the DFT-beamformed CSI-RSs. That is, the terminal 120 and the terminal 720 measure statistical channel information or a transmission correlation matrix of a channel. The statistical channel information or the transmission correlation matrix may be measured using the H-CSI-RSs and the V-CSI-RSs, and may be measured per RB or subband by broadband on a frequency axis over a long term according to a moving-average method. Further, the terminal 120 and the terminal 720 may determine the covariance of all channels by calculating a combination, for example, the Kronecker product, of the vertical channel covariance and the horizontal channel covariance. However, according to another embodiment, the vertical channel covariance and the horizontal channel covariance may be combined by the base station 110.

As in the description of the embodiment with reference to FIG. 6, the terminal 120 obtains the long-term channel information in the first mode. Here, an operation of sharing the long-term channel information may be performed for cooperative communication between cells in a multi-cell environment.

Figure 10:
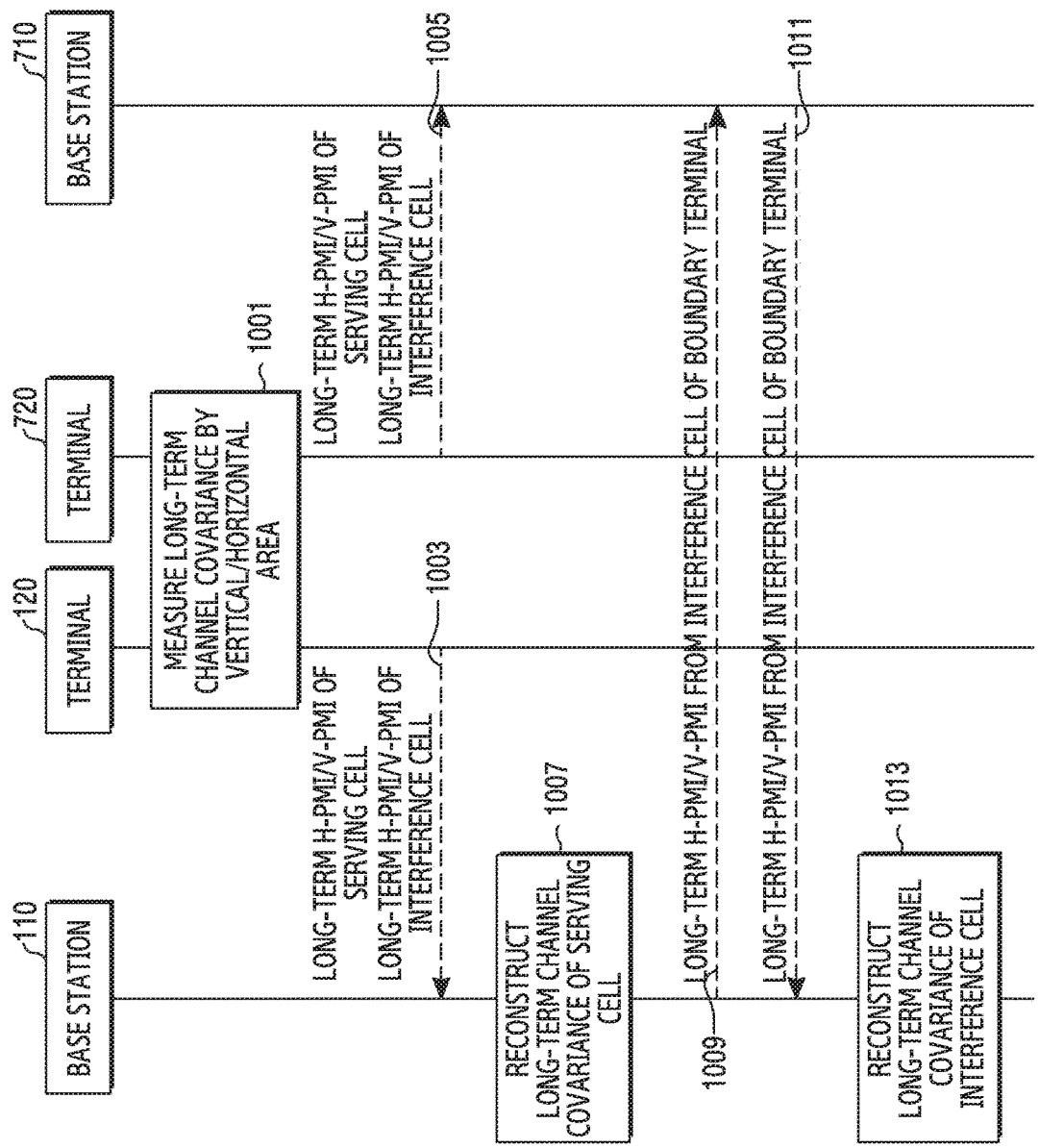
FIG. 10 illustrates an operating method for sharing long-term channel information in a wireless communication system according to various embodiments of the disclosure.

When PMI information measured using H-CSI-RSs and V-CSI-RSs, which are divided vertically/horizontally, is fed back, terminals located in an inner layer report information about a serving cell, and terminals located in an outer layer/cell-edge area provide PMI feedback information about an interference cell to a central station or an interference base station. That is, the base station obtains long-term channel information of all terminals belonging to the serving cell. In addition, the base station may provide long-term channel information of the terminals located in the cell-edge area to a base station of a neighboring cell capable of participating in cooperative communication in the form of a vertical/horizontal PMI. Here, the feedback information is provided in the form of reduced overhead and enables cooperative communication based on two-stage beamforming in FD-MIMO in the FDD system. Pre-beamforming by group necessary for cooperative communication and user grouping suitable for cooperative communication are facilitated on the basis of exchanged long-term statistical channel information. For example, the operations illustrated in FIG. 10 may be performed. FIG. 10 illustrates an operating method for sharing long-term channel information in a wireless communication system according to various embodiments of the disclosure.

Referring to FIG. 10, in operation 1001, a terminal 120 and a terminal 720 measure long-term channel covariance by each vertical/horizontal area. That is, the terminal 120 and the terminal 720 determine vertical channel covariance and horizontal channel covariance using DFT-beamformed CSI-RSs, and determine the covariance of all channels by calculating a combination, for example, the Kronecker product, of the vertical channel covariance and the horizontal channel covariance.

According to another embodiment, the terminal 120 and the terminal 720 may measure long-term channel covariance by each vertical/horizontal area on the basis of non-precoded CSI-RSs of class A. That is, the terminal 120 and the terminal 720 determine vertical channel covariance and horizontal channel covariance using the non-precoded CSI-RSs of class A, and determine the covariance of all channels by calculating a combination, for example, the Kronecker product, of the vertical channel covariance and the horizontal channel covariance.

In operation 1003, the terminal 120 transmits long-term channel information of a serving cell, that is, H-PMI and V-PMI information, to a base station 110 serving as the serving cell. Further, the terminal 120 transmits long-term channel information of an interference cell, that is, H-PMI and V-PMI information, to the base station 110 serving as the serving cell. That is, the terminal 120 transmits both the long-term channel information of the serving cell and the long-term channel information of the interference cell to the base station 110 as the serving cell.

In operation 1005, the terminal 720 transmits long-term channel information of a serving cell, that is, H-PMI and V-PMI information, to a base station 710 serving as the serving cell. Further, the terminal 720 transmits long-term channel information of an interference cell, that is, H-PMI and V-PMI information, to the base station 710 serving as the serving cell. That is, the terminal 720 transmits both the long-term channel information of the serving cell and the long-term channel information of the interference cell to the base station 710 as the serving cell.

In operation 1007, the base station 110 reconstructs the long-term channel covariance of the serving cell. That is, the base station 110 reconstructs the covariance of all channels by calculating a combination, for example, the Kronecker product, of the vertical channel covariance, which is a V-PMI, and the horizontal channel covariance, which is an H-PMI. Although not shown, the base station 710 may also perform a similar operation.

In operation 1009, the base station 110 transmits the long-term channel information from the interference cell of the terminal 120, which is a terminal on the edge, to the base station 710. The long-term channel information may include an H-PMI and a V-PMI. According to another embodiment, the long-term channel information may include the covariance of all channels generated by combining the H-PMI and the V-PMI.

In operation 1011, the base station 710 transmits the long-term channel information from the interference cell of the terminal 720, which is a terminal on the edge, to the base station 110. The long-term channel information may include an H-PMI and a V-PMI. According to another embodiment, the long-term channel information may include the covariance of all channels generated by combining the H-PMI and the V-PMI.

In operation 1013, the base station 110 reconstructs the long-term channel covariance of the interference cell. That is, the base station 110 reconstructs the covariance of all interference channels by calculating a combination, for example, the Kronecker product, of the vertical channel covariance, which is a V-PMI, and the horizontal channel covariance, which is an H-PMI. Although not shown, the base station 710 may also perform a similar operation.

According to another embodiment, the base station 710 may also perform a similar operation in order to obtain vertical/horizontal channel information on the basis of non-precoded CSI-RSs of class A.

As illustrated in the procedure of FIG. 10, long-term channel information about interference between base stations may be shared. Further, a base station may provide long-term channel information to a central station. The reason why the long-term channel information is provided to the central station is that the long-term channel information is needed in order to provide CQI or a long-term signal-to-interference-and-noise ratio (SINR) required for scheduling.

As described in an embodiment with reference to FIG. 6, the terminal 120 feeds back the long-term channel information to the base station 110, and the base station 110 determines a pre-beamformer for a group using the long-term channel information. Although not shown in FIG. 6, information about the pre-beamformer may be provided to the terminal 120. An operation of providing the information about the pre-beamformer will be described in detail below.

A base station may intermittently report a pre-beamformer $Q_g$ for each group via a control channel (e.g., an enhanced physical downlink control channel (ePDCCH)) or a data channel (e.g., a physical downlink shared channel (PDSCH)). A terminal performs measurement on a CSI-RS and compares the resultant measurement with the second-order channel covariance of a projected channel $\hat{h}_{g_k} Q_g$, which is instantaneous channel information, on the basis of $\hat{R}_{g_k}$ reported to the base station and $Q_g$ received from the base station, thereby identifying variation in second-order statistics. Alternatively, the base station may explicitly notify the terminal of $Q_g^H \hat{R}_{g_k} Q_g$ information having a reduced matrix size, that is, a feedback size, on the basis of $\hat{R}_{g_k}$ reported in advance from the terminal in the first mode and $Q_g$ determined by the base station in the second mode, or may store the information for comparison. When the variance is greater than a threshold, as in Equation 5, the terminal may request the base station to perform a procedure of measuring second-order statistical channel information again.

$$\|Q_g^H \hat{R}_{g_k} Q_g - E[Q_g^H h_{g_k} h_{g_k}^H Q_g]\|_2^2 > \text{threshold} \qquad \text{[Equation 5]}$$

In Equation 5, $Q_g$ denotes a pre-beamformer for a $g^{th}$ group, $\hat{R}_{g_k}$ denotes an estimate of the channel covariance of a $g_k^{th}$ terminal, and $h_{g_k}$ denotes a channel for the $g_k^{th}$ terminal. When the variance exceeds the threshold, the terminal in the second mode may transition to the first mode, may be classified as a normal FD-MIMO terminal, and may be allocated an RB corresponding to the first mode.

As described above, in the case of a terminal having mobility or undergoing different one-ring scattering, even though the second-order statistical channel information is changed due to the mobility of the terminal, the base station may allocate a minimum quantity of resources for a CSI-RS and may support two-stage beamforming.

Figure 11:
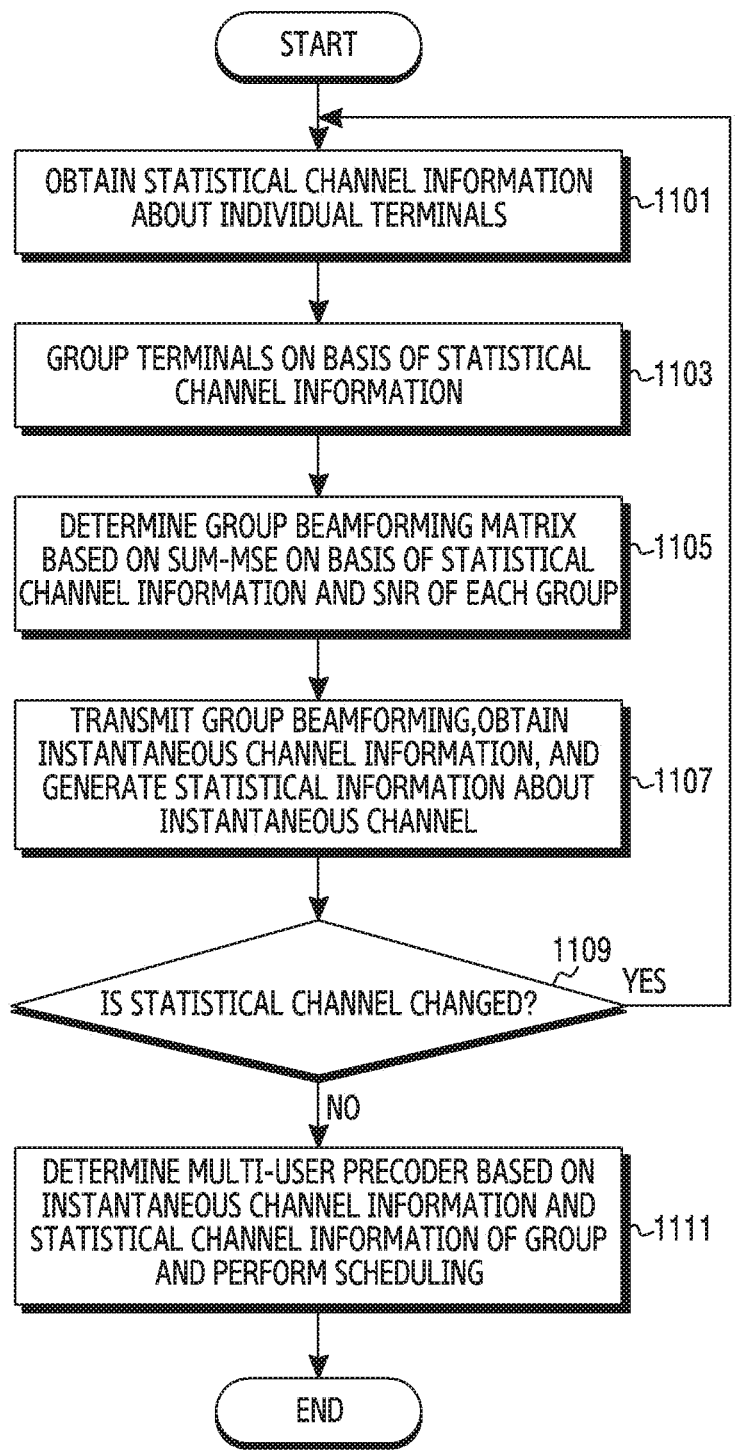
FIG. 11 illustrates an operating method for two-stage beamforming in consideration of a statistical channel change in a wireless communication system according to various embodiments of the disclosure.

A two-stage beamforming procedure considering a change in statistical channel information may be performed as illustrated in FIG. 11. FIG. 11 illustrates an operating method for two-stage beamforming considering a statistical channel change in a wireless communication system according to various embodiments of the disclosure.

Referring to FIG. 11, in operation 1101, a base station obtains statistical channel information about individual terminals. In operation 1103, the base station or a central station groups the terminals on the basis of the statistical channel information. In operation 1105, the base station or the central station determines a group beamforming matrix based on a sum-MSE on the basis of statistical channel information and channel quality (e.g., an SNR) of each group. In operation 1107, the base station transmits information about group beamforming and obtains information on an instantaneous channel. The base station or a terminal generates statistical information about the instantaneous channel Next, the base station or the terminal identifies whether the statistical channel has changed. If the statistical channel has changed, operation 1101 is performed again. If the statistical channel has not changed, the base station or the central station determines a multi-user precoder based on the instantaneous channel information and the statistical channel information of the group and performs scheduling in operation 1111.

As described in an embodiment with reference to FIG. 6, the base station 110 transmits H-CSI-RSs and V-CSI-RSs in order to measure long-term channel information. Here, resources for transmitting the CSI-RSs may be allocated in consideration of interference between base stations. The allocation of the resources for transmitting the CSI-RSs will be described in detail below.

A central station may allocate a separate CSI-RS resource in order to measure the H-CSI and the V-CSI of both a serving cell and a neighboring interference cell. Accordingly, the serving cell, which is assigned a corresponding RE from the central station, may mute an RE allocated for the neighboring cell, thereby allowing a terminal to perform measurement without interference. Further, an interference measurement resource (IMR) may be further utilized in order to identify long-term channel covariance corresponding to an interference and noise ratio (INR) excluding a cooperative cell of terminals performing communication with a serving base station.

Compared to the conventional FD-MIMO operation, one aspect of various embodiments of the disclosure is that a terminal feeds back information that is averaged over a long term for a wideband. Therefore, not only long-term H-PMI information and long-term V-PMI information of a neighboring interference cell but also information corresponding to the INR of individual terminals may be transmitted for cooperative communication in the form of long-term H-PMI information and long-term V-PMI information.

In the FDD MIMO system, in order to perform centralized scheduling, that is, cooperative scheduling, of a central station or distributed scheduling of each base station for cooperative communication, all information is collected through the central station, of information may be exchanged between base stations in a distributed manner. Accordingly, for scheduling, long-term CQI (e.g., an SINR) or RI type values may be exchanged via the central station or between base stations on the basis of long-term channel information. For example, an example of control information for feedback allocation for scheduling is illustrated in Table 1. The control information illustrated in Table 1 may be transmitted through a message of a radio resource control (RRC) layer.

TABLE 1

|  | Long-term H-CSI-RS | Long-term V-CSI-RS |
| --- | --- | --- |
| Serving cell | CSI-RS information 1<br>Reporting mode<br>Feedback timing<br>PMI codebook<br>information<br>etc. | CSI-RS information 2<br>Reporting mode<br>Feedback timing<br>PMI codebook<br>information<br>etc. |
| Neighboring<br>interference cell | CSI-RS information 3<br>Reporting mode<br>Feedback timing<br>PMI codebook<br>information<br>etc. | CSI-RS information 4<br>Reporting mode<br>Feedback timing<br>PMI codebook<br>information<br>etc. |
| For INR measurement | CSI-RS information 5<br>Reporting mode<br>Feedback timing<br>PMI codebook<br>information<br>etc. | CSI-RS information 6<br>Reporting mode<br>Feedback timing<br>PMI codebook<br>information<br>etc. |

In Table 1, 'CSI-RS information N' indicates the position of a resource allocated for a CSI-RS, and 'Reporting mode' indicates a target to be measured through the CSI-RS (e.g., a serving cell, an interference cell, or an INR), 'Feedback timing' indicates the time at which a measurement result is transmitted, and 'PMI codebook information' indicates a codebook used in generating feedback information indicating a measurement result.

The information items illustrated in Table 1 are allocated independently from each other, and the PMI codebook information includes information about a set of possible precoding matrices available for feedback. If the PMI codebook information is not included in the control information for feedback, the terminal may determine that all possible precoding matrices predefined as a standard in individual feedback may be used for feedback.

Figure 12:
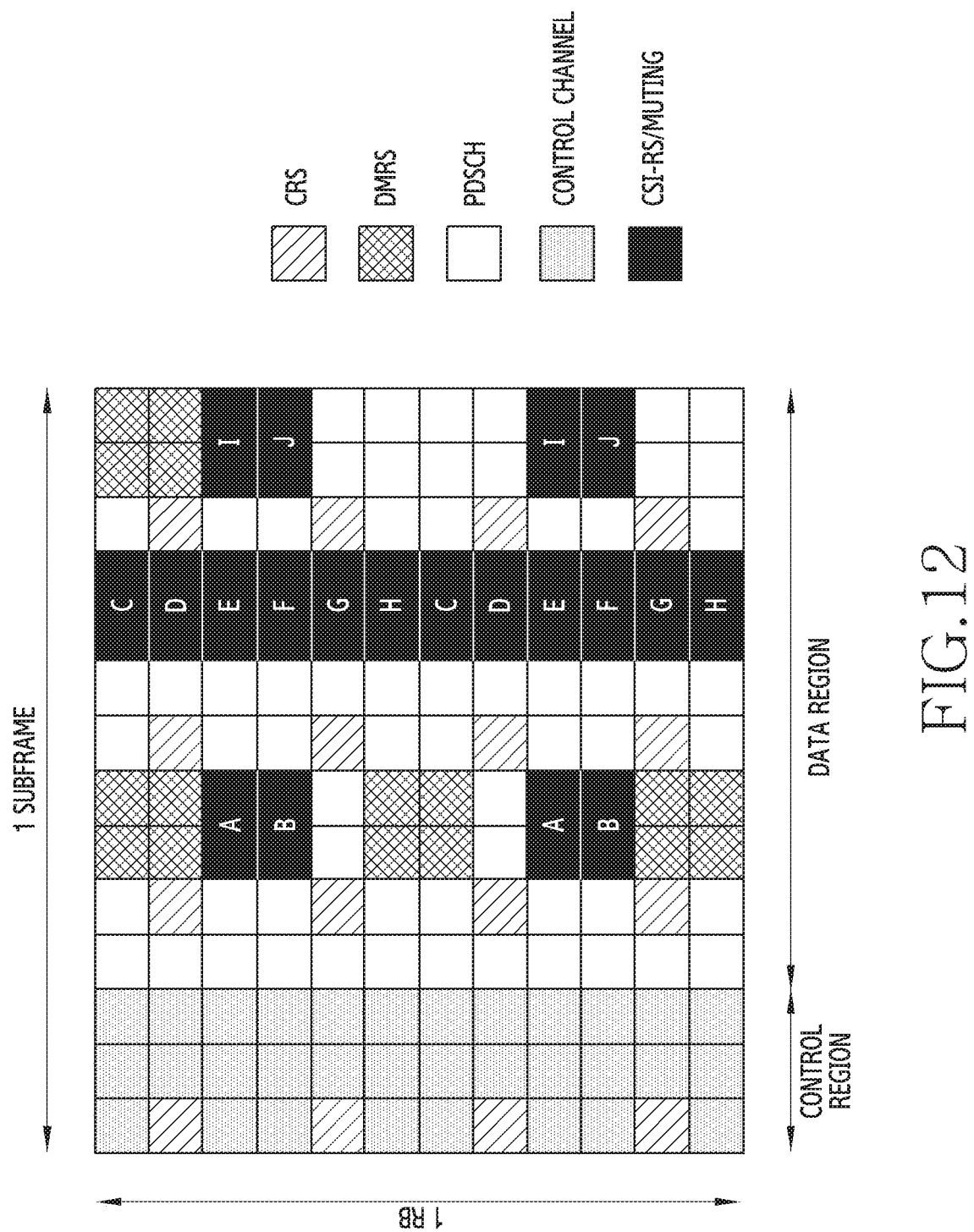
FIG. 12 illustrates an example of resource allocation for a reference signal in a wireless communication system according to various embodiments of the disclosure.

An example of REs allocated for CSI-RSs is illustrated in FIG. 12 and Table 2.

TABLE 2

|  | Long-term H-CSI-RS | Long-term V-CSI-RS |
| --- | --- | --- |
| Serving cell | Allocated RE region A | Allocated RE region B |
| Neighboring<br>interference cell | Allocated RE region B | Allocated RE region D |
| For INR measurement | Allocated RE region C | Allocated RE region F |

FIG. 12 illustrates an example of resource allocation for a reference signal in a wireless communication system according to various embodiments of the disclosure. Referring to FIG. 12 and Table 2, in one RB region of one subframe, some REs in a data region excluding a control region are allocated for CSI-RSs.

Since the number of REs included in one RB is limited, serving cell/neighboring interference cell/INR measurements may not be performed simultaneously using one RB. Thus, each measurement may be performed in a different time period or with a different frequency by frequency/time block according to the priority based on importance. In general, the priority of importance is defined in the order of "serving cell>neighboring interference cell>INR". Since an H-CSI-RS and a V-CSI-RS are independently measured on the basis of control information set by a central station, the timings and the frequencies thereof may also be defined differently.

As described in the embodiment with reference to FIG. 6, the base station 110 groups terminals on the basis of long-term channel information. Grouping of terminals will be described in detail below. Specifically, coordinated/cooperative user grouping for cooperative communication based on two-stage beamforming may be performed below.

Each base station may identify long-term interference channel covariance information from a dominant interference cell of each boundary terminal using long-term H-PMI and V-PMI information. Each base station may perform terminal grouping suitable for cooperative communication additionally in consideration of the interference channel covariance information. Alternatively, each base station may identify interference channel covariance information corresponding to an INR, excluding a neighboring interference cell. Each base station may perform grouping using the interference channel covariance information or average interference strength information.

According to another embodiment, grouping may be performed by a central station rather than a base station. In this case, the central station collects information from each base station and performs coordinated user grouping for cooperative communication. The central station may notify each base station of the grouping result. Further, the central station may determine coordinated group pre-beamforming to be used for each base station and may notify each base station of the coordinated group pre-beamformmg.

In two-stage beamforming for cooperative communication according to various embodiments, the central station also considers information not only about a terminal in an existing group in a serving cell but also about a boundary group located in an interference cell. For example, when control of interference with a terminal on the edge of an interference cell is performed using coordinated beamforming for pre-beamforming for each group on the basis of similar pieces of long-term channel information, coordinated grouping may be changed as follows.

Figure 13:
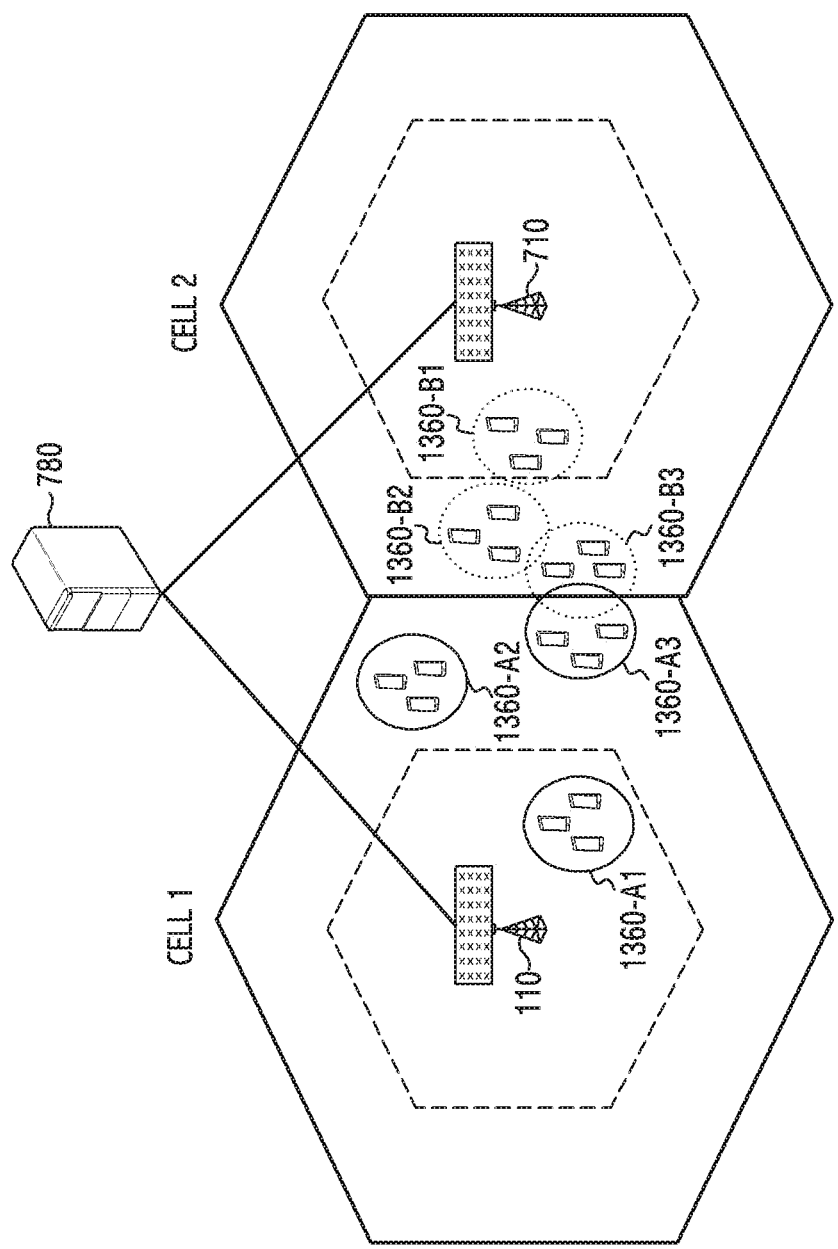
FIG. 13 illustrates an example of grouping terminals in a wireless communication system according to various embodiments of the disclosure.

FIG. 13 illustrates an example of grouping terminals in a wireless communication system according to various embodiments of the disclosure. Referring to FIG. 13, a base station 110 considers not only a group 1360-A1, a group 1360-A2, and a group 1360-A3, which belong to cell 1, but also a group 1360-B2 and a group 1360-B3, which belong to an edge area of cell 2 of a base station 710. For example, unlike long-term channel information in cell 2, long-term channel information from interference cell 1 is independent and completely different information, and thus the groups 1360-B2 and 1360-B3 may be further divided or merged, and discrete sets of individual terminals may be reestablished.

Further, although terminals in the groups 1360-A3 and 1360-B3, which are located very close to each other in adjacent areas of cell 1 and cell 2, have different serving cells, there is channel similarity in long-term channel information therebetween, and thus interference control using coordinated group-specific pre-beamforming may be ineffective. This is because, if interference terminals in a neighboring cell area occupy the same eigenspace, it is impossible to nullify interference using coordinated pre-beamforming. In this case, a central station 780 may request cooperative beamforming based on joint processing (JP) from cell 1 and cell 2. Accordingly, the group 1360-A3 and the group 1360-B3 may be merged into one group, may be divided into separate groups, or may be combined, after which interference between groups is remarkably reduced using JP- or JT-based MIMO pre-beamforming, thereby improving the spatial efficiency of each cell.

Here, it should be noted that not only the coordinated grouping but also the size of $R_g$ is changed depending on the number of cells that perform cooperative transmission through JP. If $R_g$ for each cell is 64×64 in the existing two-stage-beamforming- or coordinated-beamforming-based technology for a single cell, $R_g$ for group g, newly allocated when cell 1 and cell 2 perform JP in an integrated manner due to application of cooperative transmission, is 128×128, and a dominant rank and $U_g$ corresponding to an eigenspace may be changed. This impact may be exerted not only on the size of $\overline{Q}_g$ but also on the size of a group-specific CSI-RS allocated on the basis of $\overline{Q}_g$.

As described in the embodiment with reference to FIG. 6, the base station 110 determines a pre-beamformer using long-term channel information and applies the pre-beamformer to a group-specific CSI-RS. That is, as described above, when user grouping is performed on the basis of an H-PMI and a V-PMI and then even INR values from individual terminals are considered by each independent cell, pre-beamforming for each group may be performed according to a sum-MSE minimization method. The determination of the pre-beamformer is described in detail as follows.

A pre-beamformer for each group is determined considering a sum-MSE. A two-stage beamforming technique based on a sum-MSE according to various embodiments is more useful for a group located in a cell-edge area corresponding to a low-to-medium SNR than a ZF- or BD-based technique.

Various embodiments relate to grouping-based sum-MSE-based two-stage beamforming/precoding. Specifically, a pre-beamformer corresponding to a first stage is obtained on the basis of second-order statistic information, such as antenna correlation channel information (e.g., channel covariance) and average noise power. The pre-beamformer is configured on the basis of statistical channel information, and the same pre-beamformer may be provided for a group having similar pieces of statistical channel information. The pre-beamformer may improve a sum-MSE or long-term SINR considering noise and an INR value, thus improving the interference control performance of cell-edge terminals compared to the BD/ZF techniques.

First, a sum-MSE-based single-cell pre-beamformer $Q_g$ may be designed as follows. $Q_g$ according to various embodiments is a regularized channel inversion precoder or a pre-beamformer in the form of an MMSE transmit filter, which is determined for the issue of minimizing a sum-MSE by an $R_g$ set, which is second-order statistical channel state information, and a noise power factor. A constraint condition for $Q_g$ is defined as Equation 6 below.

$$\min_{\{Q_{g'}\},\beta} \sum_{g'=1}^{G} \mathbb{E}\left[\left\|H_{g'}^H Q_{tar,g'} V_{g'} d_{g'} - \frac{1}{\beta} y_{g'}\right\|^2\right] \quad \text{[Equation 6]}$$

$$\text{s.t.} \sum_{g'=1}^{G} Tr(V_{g'}^H Q_{g'}^H Q_{g'} V_{g'}) = P_T,$$

$$Q_{g'}^H = I, \forall g' \in \{1, \ldots, G\}$$

In Equation 6, $Q_{g'}$ denotes a pre-beamformer for a $g'^{th}$ group, β denotes a scaling parameter, g' denotes the index of a group, G denotes the number of groups, $H_{g'}$ denotes a channel for the $g'^{th}$ group, $Q_{tar,g'}$ denotes a pre-beamformer corresponding to a target channel matrix, $V_{g'}$ denotes a set of post-beamformers for terminals belonging to the $g'^{th}$ group, $d_{g'}$ denotes a desired signal, that is, a transmitted signal, to the $g'^{th}$ group, $y_{g'}$ denotes a received signal of the $g'^{th}$ group, $P_T$ denotes total transmission power, and I denotes an identity matrix. Here, $Q_{tar,g'}$ may be a tall unitary eigen-beamformer $U_g$ based on $R_g$ as a target channel matrix or a BD-based pre-beamformer.

For optimization, Equation 6 is combined with a tall unitary condition, which is $Q_{g'}^H Q_{g'} = I, \forall g' \in \{1, \ldots G\}$, and thus is not easy to solve. The tall unitary condition is a constraint for a pre-beamformer to help make the layer-specific statistical characteristics of a projected channel the same while being orthogonal to group g. In this case, the problem encountered when relaxing the tall unitary condition, which is $Q_{g'}^H Q_{g'} = I, \forall g' \in \{1, \ldots, G\}$, may be defined as Equation 7 below.

$$\min_{\{Q_{g'}\},\beta} \sum_{g'=1}^{G} \mathbb{E}\left[\left\|H_{g'}^H Q_{tar,g'} V_{g'} d_{g'} - \frac{1}{\beta} y_{g'}\right\|^2\right] \quad \text{[Equation 7]}$$

$$\text{s.t.} \sum_{g'=1}^{G} Tr(V_{g'}^H Q_{g'}^H Q_{g'} V_{g'}) = P_T$$

In Equation 7, $Q_{g'}$ denotes a pre-beamformer for a $g'^{th}$ group, β denotes a scaling parameter, g' denotes the index of a group, G denotes the number of groups, $H_{g'}$ denotes a channel for the $g'^{th}$ group, $Q_{tar,g'}$ denotes a pre-beamformer corresponding to a target channel matrix, $V_{g'}$ denotes a set of post-beamformers for terminals belonging to the $g'^{th}$ group, $d_{g'}$ denotes a desired signal, that is, a transmitted signal, to the $g'^{th}$ group, $y_{g'}$ denotes a received signal of the $g'^{th}$ group, $P_T$ denotes total transmission power, and I denotes an identity matrix.

The above problem may be modified into a dual optimization problem or an unconstraint optimization problem using a Lagrange multiplier, to which a matrix product inequality, a trace lemma of large system analysis or a random matrix theory, and a group-specific sum-MSE decomposition for a pre-beamformer $Q_g$ are merely and simply applied in order, thereby applying a limited pre-beamformer represented by Equation 8. There is technical difficulty in designing a pre-beamformer in a closed form considering not only long-term channel information but also noise and an INR value, which has been experimentally confirmed to have excellent performance compared to any conventional technique.

$$\hat{\tilde{Q}}_g = K_g \left( \sum_{c=1}^{G} K_c R_c + \frac{K\sigma^2}{P_T} I_{N_T} \right)^{-1} R_g Q_{tar,g} \quad \text{[Equation 8]}$$

In Equation 8, $\tilde{Q}_g$ denotes an intermediate-stage pre-beamforming matrix for determining a $g^{th}$ pre-beamformer that minimizes a sum-MSE, $K_g$ denotes the number of terminals belonging to a $g^{th}$ group, G denotes the number of groups, $R_c$ denotes the channel covariance of a $C^{th}$ group, K denotes the total number of terminals, $\sigma^2$ denotes noise and interference power, $P_T$ denotes total transmission power, $I_{N_T}$ denotes an identity matrix having a size of $N_T$, and $Q_{tar,g}$ denotes a pre-beamformer corresponding to a target channel matrix. Here, $Q_{tar,g'}$ may be a tall unitary eigen-beamformer $U_g$ based on $R_g$ as a target channel matrix or a BD-based pre-beamformer. Further, $\tilde{Q}_g$ denotes the product of channel covariance and a pre-beamformer, and QR decomposition of $\tilde{Q}_g$ is performed in order to satisfy an orthogonality constraint, thereby obtaining a final pre-beamformer $Q_g$.

In Equation 8, a tall unitary eigen-beamformer or a BD-based pre-beamformer may be used. Using a BD-based pre-beamformer realizes the advantage of BD in a high-SNR environment and provides the effect of MMSE channel inversion, which prevents noise enhancement in a low-to-medium SNR environment.

Referring to Equation 8, group-specific long-term channel information $R_g$ provides the characteristics of a MMSE-based linear transmission filter along with an identity matrix belonging to a single cell. Thus, a group-specific INR, a long-term sum-MSE, or a long-term SINR (e.g., CQI) is optimized.

Next, sum-MSE-based coordinated pre-beamforming additionally considering an interference group in a neighboring interference cell for a multi-cell environment will be described below.

For multi cells, a pre-beamformer is designed in consideration of channel similarity or eigenspace $U_g$ of long-term channel information about the interference that a group on the edge of a neighboring interference cell receives from a serving cell. As described above, for coordinated beamforming, a base station of the serving cell receives, from a central station, long-term H-PMI and V-PMI information corresponding to an interference leakage channel from an interference terminal on the edge of the neighboring interference cell. Pre-beamformers may be determined by respective base stations in a distributed manner or by the central station in a centralized manner. In coordinated group pre-beamforming, control or nulling of interference between groups of neighboring interference cells is performed by projection additionally in consideration of a null space of the dominant eigenspace of an interference group channel of the neighboring cells.

In addition, interference control considering a null space may be extended to pre-beamforming in consideration of a sum-MSE. For example, instead of the group sum-MSE of a cell in Equation 7, interference control considering a null space may be integrated with the total sum-MSE between groups of all cells, which may be represented by an equation similar to Equation 8. Specifically, a pre-beamformer considering a multi-cell environment includes the interference PMI $R_g$ of the boundary groups of a neighboring interference cell in matrix inversion and is induced as a regularized channel inversion precoder or an MMSE transmission filter. As in a single-cell sum-MSE-based pre-beamforming induction method, using a lagrange multiplier, a corresponding multi-cell sum-MSE problem may be modified into an unconstraint optimization problem using a Lagrange multiplier, to which a matrix product inequality, a trace lemma of large system analysis or a random matrix theory, and a group-specific sum-MSE decomposition for a pre-beamformer $Q_g$, are merely and simply applied in order, thereby obtaining a transmission power constraint.

Next, sum-MSE-based JP-based pre-beamforming additionally considering an interference group in a neighboring interference cell for a multi-cell environment may be performed as follows.

Since JP is a method of re-performing cell grouping on boundary groups of cell 1 and cell 2 and performing MU-MIMO on one super cell, new user grouping and the size of $R_g$ increase according to the number of cooperative cells involved in JP. Thus, the procedure may be similar to the foregoing procedure of performing sum-MSE-based pre-beamforming in a single cell except for a grouping operation and the size of $R_g$.

As described in the embodiment with reference to FIG. 6, after terminals are grouped, the base station 110 transmits a group-specific CSI-RS and receives short-term channel information. The operation of the group-specific CSI-RS will be described in detail as follows.

A base station receives instantaneous channel information, which is measured from a group-specific CSI-RS to which a group beamformer $Q_g$ is applied, from terminals. The instantaneous channel information $h_{g_k}{}^H Q_g$, which is short-term channel information and a projected channel, may be provided to the base station according to an implicit feedback scheme or an explicit feedback scheme. The instantaneous channel information may include at least one of information about recognition of a change in a transmission correlation matrix (e.g., channel covariance $\hat{R}_{g_k}$), an adaptive codebook index, a fixed codebook index, multi-user CQI (MU-CQI), group interference measurement, and an RI. Here, the group-specific CSI-RS is an RS beamformed by a group beamformer $Q_g$ and is transmitted by sharing the same resource among groups. Accordingly, resource consumption for RSs may be reduced. Further, the base station may receive CQI, that is, an SINR, which is predicted on average from the group-specific CSI-RS, from each terminal and may provide and share, to and with a different base station, long-term scheduling information and short-term rescheduling information that satisfy network PF metric sum maximization in order to maximize a multi-cell network utility.

The group-specific CSI-RS to which sum-MSE-based pre-beamforming is applied according to various embodiments is an RS that is specific to each group, and is obtained by multiplying a DM-RS of an LTE-A system or a UE-specific RS of an LTE system by a beamforming matrix. Here, S' group-specific RSs are generated by multiplying each group beamforming vector $q_{g,I}$ ($i^{th}$ column vector of $Q_g=[q_{g,1}, q_{g,2}, \ldots, q_{g,B'}]$). When S'<B', some S' RSs may be selected in order to reduce the overhead of RSs. Further, the same resource may be used without mutual interference by applying a pseudo-random sequence, as in a DM-RS.

Compared to a CSI-RS of the LTE system, the group-specific RS performs CSI-RS functions of the LTE system as follows. First, the group-specific CSI-RS is used to provide an environment in which terminals can feed back instantaneous channel information. In various embodiments, a terminal may estimate $h_{g_k}{}^H Q_g$ or $h_{g_k}{}^H q_{g,j}$ through the group-specific RS and may generate explicit feedback information, such as CQI, a PMI, and an RI, on the basis thereof. Further, the terminal may provide long-term CQI suitable for network proportional fair (PF) sum maximization for cooperative communication. Second, the group-specific CSI-RS functions as a CSI-RS to enable terminals to perform averaging or low-pass filtering (LPF) of instantaneous channel information into second-order channel covariance, thereby providing data to be compared with $Q_g{}^H \hat{R}_{g_k} Q_g$ information implicitly/explicitly indicated by the base station. That is, the terminals may determine statistical channel information from the instantaneous channel information and may compare the determined statistical channel information with statistical information provided from the base station.

As described in the embodiment with reference to FIG. 6, the terminal 120 determines short-term channel information using a group-specific CSI-RS and feeds back the short-term channel information. A channel feedback operation of the terminal will be described in detail as follows.

Feedback information of a terminal may be based on a fixed codebook or an adaptive codebook. A fixed codebook/adaptive codebook for short-term channel information may be designed as follows. As feedback of explicit channel information, direct information on short-term channel information may be fed back instead of a PMI. The terminal quantizes $h_{g_k}{}^H Q_g$ and feeds back $h_{g_k}{}^H Q_g$ to the base station. For example, channel information may be quantized into CDI.

In the FDD system, channel estimation based on a random vector quantization (RVQ) codebook may be basically performed through channel quantization. The terminal may measure a transmission correlation matrix $R_{TX}$, where $R_{TX}=Q_g{}^H \hat{R}_{g_k} Q_g$, from a group-specific CSI-RS to which group beamforming $Q_g$ is applied. The terminal may receive $R_{TX}$ as long-term channel information from the base station and may operate an RVQ codebook considering a channel spatial correlation. For example, the RVQ codebook may be defined as Equation 9 below.

$$W_{RVQ}=R_{TX}{}^{1/2}C_{RVQ}=(Q_g{}^H \hat{R}_{g_k} Q_g)^{1/2}C_{RVQ} \quad \text{[Equation 9]}$$

In Equation 9, $W_{RVQ}$ denotes a codebook considering a channel spatial correlation, $R_{TX}$ denotes a transmission correlation matrix, $C_{RVQ}$ denotes a random vector quantization (RVQ) codebook, $Q_g$ denotes a pre-beamformer for a $g^{th}$ group, and $\hat{R}_{g_k}$ denotes the channel covariance estimate of a $g_k{}^{th}$ terminal. Here, $W_{RVQ}$ is a codebook having a distribution of $h_{g_k}{}^H Q_g$.

The terminal determines CDI using an inner product in order to find the index of a quantization channel closest to a known channel CDI may be determined as Equation 10 below.

$$\arg \max_j |h_{g_k}^H Q_g w_{RVQ,j}| \quad \text{[Equation 10]}$$

In Equation 10, $h_{g_k}$ denotes a channel for a $g_k{}^{th}$ terminal, $Q_g$ denotes a pre-beamformer for a $g^{th}$ group, and $W_{RVQ,j}$ denotes a $j^{th}$ entity of an RVQ codebook in consideration of a channel spatial correlation.

As described in the embodiment with reference to FIG. 6, the base station 110 receives short-term channel information and determines a post-beamformer, that is, a beamforming matrix, for the terminal 120 using the short-term channel information. The determination of the post-beamformer will be described in detail as follows.

A post-beamformer is determined on the basis of short-term channel information. Furthermore, a post-beamformer may be determined on the basis of short-term channel information and long-term channel information. Here, the post-beamformer may be determined on the basis of a weighted MMSE. That is, a post-beamformer according to various embodiments is designed in consideration not only of intra-group interference but also of inter-group interference and noise in order to improve the reception SINR of a terminal and to satisfy requirements for sum-rate maximization.

For example, a post-beamformer for a terminal may be determined as Equation 11 below.

$$v_{g_k} = \gamma \bar{v}_{g_k} \quad \text{[Equation 11]}$$
$$= \gamma s_{g_k} u_{g_k} \left( \sum_{j=1}^{K_g} \beta_{g_j} Q_g^H h_{g_j} h_{g_j}^H Q_g + C_g + \lambda I \right)^{-1}$$
$$Q_g h_{g_k}$$

In Equation 11, $v_{g_k}$ denotes a post-beamformer for a $g_k{}^{th}$ terminal, $\gamma$ denotes a power normalization factor, $\bar{v}_{g_k}$ denotes a post-beamformer corresponding to a normalized version of the post-beamformer $v_{g_k}$ for the $g_k{}^{th}$ terminal, $s_{g_k}$ denotes a weight for sum-rate maximization, $u_{g_k}$ denotes a scalar value corresponding to a reception filter for the $g_k{}^{th}$ terminal, $K_g$ denotes the number of terminals belonging to a $g^{th}$ group, $\beta_{gj}$ denotes a beam weight for a $g_j{}^{th}$ terminal, $Q_g$ denotes a pre-beamformer for the $g^{th}$ group, $h_{gj}$ denotes a channel for the $g_j{}^{th}$ terminal, $C_g$ denotes a covariance matrix for the $g^{th}$ group, $\lambda$ denotes a factor considered for a beamforming direction, and I denotes an identity matrix, where $\beta_{gj}$ is defined by $\beta_{gj}=|u_{gj}|^2 s_{gj}$, and $C_g$ is defined by $$C_g = \sum_{c \neq g} \sum_{j=1}^{K_c} \beta_{cj} Q_g^H R_c Q_g.$$

In Equation 11, a power normalization factor is a value considered for power normalization and affects beamforming power. The power normalization factor may be determined as Equation 12 below.

$$\gamma = \sqrt{\frac{P_T}{\sum_{g=1}^{G} \sum_{k=1}^{K_g} \|Q_g \bar{v}_{gk}\|^2}} \quad \text{[Equation 12]}$$

In Equation 12, γ denotes a power normalization factor, $P_T$ denotes total transmission power, G denotes the number of groups, $K_g$ denotes the number of terminals belonging to a $g^{th}$ group, $Q_g$ denotes a pre-beamformer for the $g^{th}$ group, and $\overline{v}_{g_k}$ denotes a post-beamformer corresponding to a normalized version of a post-beamformer $v_{g_k}$ for a $g_k^{th}$ terminal.

In Equation 11, λ is considered for a beamforming direction and may be determined as Equation 13 below.

$$\lambda = \frac{\sigma^2}{P_T} \sum_{g=1}^{G} \sum_{k=1}^{K_g} |u_{g_k}|^2 s_{g_k} \qquad \text{[Equation 13]}$$

In Equation 13, λ denotes a factor considered for a beamforming direction, $\sigma^2$ denotes noise and interference power, $P_T$ denotes total transmission power, G denotes the number of groups, $K_g$ denotes the number of terminals belonging to a $g^{th}$ group, $s_{g_k}$ denotes a weight for sum-rate maximization, and $u_{g_k}$ denotes a scalar value corresponding to a reception filter for a $g_k^{th}$ terminal.

As described in the embodiment with reference to FIG. 6, the base station 110 transmits a data signal along with a DM-RS. The DM-RS is beamformed by a pre-beamformer and a post-beamformer. The operation of the DM-RS will be described in detail as follows. That is, the operation of a user-specific DM-RS for a projected channel for data decoding of a terminal will be described below.

First, a base station allocates a user-specific DM-RS as follows. As described above, a group-specific CSI-RS is used to measure short-term channel information of a projected channel $h_{g_k}^H Q_g$ to which per-group pre-beamforming is applied. The base station may determine a post-beamformer/precoder, that is, weighted MMSE-based $\{v_{g_k}\}$ as a per-group processing (PGP) multi-user precoder, on the basis of the short-term channel information of the obtained projected channel $h_{g_k}^H Q_g$ and statistical channel information $Q_g^H R_g Q_g$ for a different group.

When a pre-beamformer $Q_g$ and a post-beamformer $v_{g_k}$ are determined, a user-specific DM-RS suitable for a $g_k^{th}$ terminal is allocated. The user-specific DM-RS may be used to demodulate a data signal. Since the terminal reports a PMI about a group-specific CSI-RS, the terminal determines that a transmission signal $Q_g v_{g_k}$ is beamformed through the PMI fed back by the terminal. Therefore, the terminal may perform decoding using the DM-RS without additional information for identifying a beamforming vector selected by the base station.

For example, when the terminal feeds back two CQIs and PMIs in rank 2, the terminal may perform blind detection to identify the number of ranks and the PMI that the base station has actually applied. Specifically, the terminal may perform detection for three cases, which are rank 2 in which both a first PMI and a second PMI2 are used, rank 1 in which the first PMI is used, and rank 1 in which the second PMI is used, and may then calculate a post-SINR, thereby determining an accurate rank and PMI.

In addition to the embodiment described with reference to FIG. 6, upon receiving a DM-RS, the terminal may feed back channel information. The feedback of additional channel information will be described in detail as follows.

The terminal may report MU-CQI and RI channel feedback as follows. When a DM-RS is allocated, the terminal may estimate the inner product $h_{g_k}^H Q_g v_{gm}$, m=1, ..., $k_g$ of beamforming vectors of the group to which the terminal belongs and a channel through the DM-RS. Assuming that all $K_g$ beamforming vectors are simultaneously transmitted, the terminal measures MU-CQI corresponding to an SINR according to Equation 14 and feeds back the MU-CQI to the base station.

$$MU-CQI_{g_k} = \frac{|h_{g_k}^H Q_g v_{g_k}|^2}{\sigma^2 + \sum_{m \neq k} |h_{g_k}^H Q_g v_{gm}|^2} \qquad \text{[Equation 14]}$$

In Equation 14, $MU-CQI_{g_k}$ denotes multi-user channel quality information of a $g_k^{th}$ terminal, $h_{g_k}$ denotes a channel for the $g_k^{th}$ terminal, $Q_g$ denotes a pre-beamformer for a $g^{th}$ group, vgk denotes a post-beamformer for the $g_k^{th}$ terminal, and $\sigma^2$ denotes noise and interference power.

In Equation 14, $\sigma^2$ denotes background noise and interference from other cells. The base station may perform control so that only a terminal that measures MU-CQI exceeding a specified threshold value feeds back channel information.

Inter-group interference may be measured as follows. The above MU-CQI is calculated assuming that interference from other groups is insignificant. When there is a significant mismatch between a pre-beamforming matrix $Q_g$ for a group and an eigen-matrix $U_g$ of a terminal gk or when a plurality of terminals belongs to a different group, the terminal may receive substantial interference from the different group. According to various embodiments, to solve this potential problem, the terminal may not only receive a group-specific RS or a DM-RS of a group of the terminal but also use a group-specific RS or a DM-RS of a different group. Specifically, the terminal may receive a group-specific RS or a DM-RS of a different group, and may estimate relevant $|h_{g_k}^H Q_n v_{n_m}|^2$ if a particular beam of the different group causes significant interference. Here, it is preferable for the terminal to perform estimation $|h_{g_k}^K Q_n v_{n_m}|^2$ by eliminating a beam $|h_{g_k}^H Q_g v_{gm}|^2$, m=1, ..., $k_g$ of the group of the terminal from a received signal. To this end, the base station may provide control information to terminals belonging to a particular group so that the terminals may receive group-specific RSs or DM-RSs of all groups or may use a group-specific RS sequence determination equation to which not only a cell ID but also a group ID is added. When the terminal considers interference from a different group, MU-CQI may be determined by Equation 15.

$$MU-CQI_{g_k} = \frac{|h_{g_k}^H Q_g v_{g_k}|^2}{\sigma^2 + \sum_{m \neq k} |h_{g_k}^H Q_g v_{gm}|^2 + \sum_{n \neq g} \sum_m |h_{g_k}^H Q_n v_{n_m}|^2} \qquad \text{[Equation 15]}$$

In Equation 15, $MU-CQI_{g_k}$ denotes multi-user channel quality information of a $g_k^{th}$ terminal, $h_{g_k}$ denotes a channel for the $g_k^{th}$ terminal, $Q_g$ denotes a pre-beamformer for a $g^{th}$ group, $v_{g_k}$ denotes a post-beamformer for the $g_k^{th}$ terminal, and $\sigma^2$ denotes noise and interference power.

Referring to Equation 15, $$\sum_{n \neq g} \sum_m |h_{g_k}^H Q_n v_{n_m}|^2$$

among the terms of the denominator is an interference component attributable to terminals in a different group.

Here, considering the decrease in the complexity of calculations and an actual interference level, only a group causing interference greater than a threshold may be used for calculating $$\sum_{n \neq g} \sum_{m} |h_{g_k}^H Q_n v_{n_m}|^2.$$

An RI report of the terminal may be performed as follows. In an environment in which there are a large number of transmission antennas and active terminals, an adaptive beam optimized for MU-MIMO is utilized according to various embodiments. Therefore, there is a very high probability that all MIMO resources are scheduled for MU-MIMO. In this case, the base station may generally limit the rank of the terminal to 1 or 2, thereby increasing system capacity. When the rank set by the base station is 2, the terminal feeds back pieces of CSI corresponding to two codewords. Thus, the base station may identify feedback from terminals belonging to each group and may determine whether to actually perform rank-1 transmission or rank-2 transmission to a scheduled terminal.

In addition to an embodiment described with reference to FIG. 6, the central station may perform scheduling using channel information fed back from terminals. The scheduling operation will be described in detail as follows.

The central station may perform centralized/coordinated scheduling as follows. The central station may reconstruct long-term channel information from all H-PMIs/V-PMIs of a serving cell/interference cell provided from each base station and may perform coordinated scheduling for a multi-cell environment using the long-term channel information. Then, the central station may estimate an RI and CQI from group CSI to which pre-beamforming is applied. The scheduling performed by the central station is a type of maximizing a log utility function, which is MU-CQI multiplied by a weight indicating the fairness of each terminal, and may be performed in a manner of maximizing network utility rather than for individual cells. Thus, after scheduling by the central station, detailed scheduling by an individual base station may be further performed.

According to the disclosure, in massive MIMO transmission in an FDD system, statistical channel information may be efficiently obtained. Furthermore, according to various embodiments, it is possible to change statistical channel information and to efficiently configure user grouping according to the movement and handover of a particular terminal, and it is possible to significantly reduce the amount of channel state information that is fed back. In addition, even though the amount of channel state information that is fed back is reduced, deterioration in frequency efficiency in an uplink and a downlink is minimized, and superior performance is provided even in a low-to-medium SNR environment.

Methods according to embodiments stated in claims and/or specifications of the disclosure may be implemented in hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a Read Only Memory (ROM), an Electrically Erasable Programmable Read Only Memory (EEPROM), a magnetic disc storage device, a Compact Disc-ROM (CD-ROM), Digital Versatile Discs (DVDs), or other type optical storage devices, or a magnetic cassette. Alternatively, any combination of some or all of the may form a memory in which the program is stored. Further, a plurality of such memories may be included in the electronic device.

In addition, the programs may be stored in an attachable storage device which is accessible through communication networks such as the Internet, Intranet, local area network (LAN), wide area network (WAN), and storage area network (SAN), or a combination thereof. Such a storage device may access the electronic device via an external port. Further, a separate storage device on the communication network may access a portable electronic device.

In the above-described detailed embodiments of the disclosure, a component included in the disclosure is expressed in the singular or the plural according to a presented detailed embodiment. However, the singular form or plural form is selected for convenience of description suitable for the presented situation, and various embodiments of the disclosure are not limited to a single element or multiple elements thereof. Further, either multiple elements expressed in the description may be configured into a single element or a single element in the description may be configured into multiple elements.

While the disclosure has been shown and described with reference to certain embodiments thereof, it will be understood by those skilled in the art that various changes in form and details may be made therein without departing from the scope of the disclosure. Therefore, the scope of the disclosure should not be defined as being limited to the embodiments, but should be defined by the appended claims and equivalents thereof.

The invention claimed is:

1. A method for operating a base station in a wireless communication system, the method comprising:
   transmitting vertical reference signals and horizontal reference signals that are generated based on an interference relationship between terminals;
   receiving long-term channel information determined by using the vertical reference signals and the horizontal reference signals;
   transmitting reference signals beamformed by a first beamformer generated based on the long-term channel information;
   receiving short-term channel information determined by using the beamformed reference signals; and
   transmitting a data signal beamformed by a second beamformer generated based on the short-term channel information.

2. The method of claim 1, further comprising receiving, from another base station, long-term channel information for a serving terminal of the another base station for cooperative communication with the another base station.

3. The method of claim 1, further comprising receiving uplink reference signals from the terminals in order to determine the interference relationship between the terminals.

4. The method of claim 1, further comprising grouping the terminals in consideration of at least one terminal located on an edge of at least one neighboring cell.

5. The method of claim 1, further comprising transmitting long-term channel information for an interference cell, which is received from a serving terminal, to at least one of a neighboring base station or a central station.

6. The method of claim 1, further comprising:
receiving, from a terminal located in a neighboring cell, information for interference exerted on the terminal by a serving base station of the terminal; and
determining the first beamformer in consideration of the information for the interference.

7. The method of claim 1, further comprising:
determining the first beamformer that is a sum-mean square error (MSE) based beamformer, based on the long-term channel information; and
determining the second beamformer that is a weighted minimum mean square error (MMSE) based beamformer, based on the short-term channel information,
wherein the vertical reference signals and the horizontal reference signals are transmitted and received through a resource different from a resource for transmitting vertical reference signals and horizontal reference signals transmitted from a neighboring base station.

8. A method for operating a terminal in a wireless communication system, the method comprising:
receiving, from a base station, vertical reference signals and horizontal reference signals that are generated based on an interference relationship between terminals;
transmitting long-term channel information determined by using the vertical reference signals and the horizontal reference signals;
receiving reference signals beamformed by a first beamformer generated based on the long-term channel information;
transmitting short-term channel information determined by using the beamformed reference signals; and
receiving a data signal beamformed by a second beamformer generated based on the short-term channel information.

9. The method of claim 8, further comprising transmitting an uplink reference signal so that the base station determines the interference relationship between the terminals.

10. The method of claim 8, wherein the terminals are grouped in consideration of at least one terminal located on an edge of at least one neighboring cell.

11. The method of claim 8, wherein the first beamformer is determined in consideration of interference exerted on a terminal by a serving base station of the terminal.

12. The method of claim 8, further comprising transmitting long-term channel information measured based on the beamformed reference signals to the base station for determination of a network utility, determination of a multi-cell sum utility, and network sum-proportional fair (PF) maximization.

13. The method of claim 8,
wherein the first beamformer, that is a sum-mean square error (MSE) based beamformer, is determined based on the long-term channel information,
wherein the second beamformer, that is a weighted minimum mean square error (MMSE) based beamformer, is determined based on the short-term channel information, and
wherein the vertical reference signals and the horizontal reference signals are transmitted and received through a resource different from a resource for transmitting vertical reference signals and horizontal reference signals transmitted from a neighboring base station.

14. A base station in a wireless communication system, the base station comprising:
a transceiver; and
at least one processor operably coupled to the transceiver, wherein the at least one processor is configured to:
transmit vertical reference signals and horizontal reference signals that are generated based on an interference relationship between terminals,
receive long-term channel information determined by using the vertical reference signals and the horizontal reference signals,
transmit reference signals beamformed by a first beamformer generated based on the long-term channel information,
receive short-term channel information determined by using the beamformed reference signals, and
transmit a data signal beamformed by a second beamformer generated based on the short-term channel information.

15. The base station of claim 14, further comprising:
a backhaul communication unit configured to receive, from another base station, long-term channel information for a serving terminal of the another base station for cooperative communication with the another base station.

16. The base station of claim 14, wherein the transceiver is configured to:
receive uplink reference signals from the terminals in order to determine the interference relationship between the terminals.

17. The base station of claim 14, wherein the at least one processor is further configured to:
group the terminals in consideration of at least one terminal located on an edge of at least one neighboring cell.

18. The base station of claim 14, wherein the at least one processor is further configured to:
control to transmit long-term channel information for an interference cell, which is received from a serving terminal, to at least one of a neighboring base station or a central station.

19. The base station of claim 14, wherein the at least one processor is further configured to:
receive, from a terminal, information for interference exerted on the terminal by a serving base station of the terminal, and
determine the first beamformer in consideration of the information for the interference.

20. The base station of claim 14, wherein the at least one processor is further configured to:
determine the first beamformer that is a sum-mean square error (MSE) based beamformer, based on the long-term channel information, and
determine the second beamformer that is a weighted minimum mean square error (MMSE) based beamformer, based on the short-term channel information,
wherein the vertical reference signals and the horizontal reference signals are transmitted and received through a resource different from a resource for transmitting vertical reference signals and horizontal reference signals transmitted from a neighboring base station.

* * * * *